(12) United States Patent
Hashimoto

(10) Patent No.: US 8,084,977 B2
(45) Date of Patent: Dec. 27, 2011

(54) MOTOR CONTROL DEVICE AND COMPRESSOR

(75) Inventor: Eiichiro Hashimoto, Kyoto (JP)

(73) Assignee: SANYO Electric Co., Ltd., Moriguchi (JP)

( * ) Notice: Subject to any disclaimer, the term of this patent is extended or adjusted under 35 U.S.C. 154(b) by 689 days.

(21) Appl. No.: 12/186,812

(22) Filed: Aug. 6, 2008

(65) Prior Publication Data

US 2009/0039808 A1 Feb. 12, 2009

(30) Foreign Application Priority Data

Aug. 10, 2007 (JP) .................. 2007-210307

(51) Int. Cl.
*H02P 7/00* (2006.01)
(52) U.S. Cl. .................. 318/432; 318/400.2; 318/560
(58) Field of Classification Search .................. 318/432, 318/400.2, 560, 568.22, 629, 632
See application file for complete search history.

(56) References Cited

U.S. PATENT DOCUMENTS

2001/0002097 A1* 5/2001 Tsutsui .................. 318/560

FOREIGN PATENT DOCUMENTS

| JP | 2001268963 | 9/2001 |
| JP | 2003329285 | 11/2003 |
| JP | 2006-180605 | 7/2006 |
| JP | 2006-191737 | 7/2006 |
| JP | 2006191737 | 7/2006 |

OTHER PUBLICATIONS

Japanese Office Action, dated Jul. 21, 2009; English translation included.
Yasuo Notohara et al.; "Reduction Control Method of Periodic Torque Disturbance for Compressor"; 2004 Annual Conference of the Industry Applications Society of the Institute of Electrical Engineers of Japan; 1-57 (I-337-I-340); Sep. 14, 2004.
Hida et al.; "Position Sensorless Vector Control for Permanent Magnet Synchronous Motors Based on Maximum Torque Control Frame"; Industry Applications Society of the Institute of Electrical Engineers of Japan; included in Collection of the Lecture Treatises at 2006 Annual Conference of the Industry Applications Society of the Institute of Electrical Engineers of Japan; pp. 385-388 (I-385-I-388); Aug. 2006.
Corresponding Chinese Office Action, dated May 10, 2010; English translation included.

* cited by examiner

*Primary Examiner* — Karen Masih
(74) *Attorney, Agent, or Firm* — NDQ&M Watchstone LLP

(57) ABSTRACT

A motor control device performing vector control for a motor that drives a load whose load torque varies periodically. The motor control device has: a motor speed deriving portion estimating or detecting a motor speed; a speed controller producing a specified torque current value such that the motor speed is made to follow a specified motor speed value fed from outside; a resonance filter producing a corrected torque current value by receiving a control value that varies with variations in the load torque and emphasizing a periodic variation component of the control value; a torque current corrector producing a specified superimposed torque current value by superimposing the corrected torque current value on the specified torque current value; and an adjusting portion adjusting, based on the specified superimposed torque current value, the phase of the corrected torque value by controlling the resonance filter. The vector control is performed according to the specified superimposed torque current value.

16 Claims, 14 Drawing Sheets

US 8,084,977 B2

MOTOR CONTROL DEVICE AND COMPRESSOR

This nonprovisional application claims priority under 35 U.S.C. §119(a) on Patent Application No. 2007-210307 filed in Japan on Aug. 10, 2007, the entire contents of which are hereby incorporated by reference.

BACKGROUND OF THE INVENTION

1. Field of the Invention

The present invention relates to motor control devices that control a motor and to compressors.

2. Description of Related Art

A load factor of a motor often entails periodic load variations. A compressor used in an air conditioner or the like is an example of a product including such a load factor. In a hermetic type compressor used in an air conditioner, a change in refrigerant gas pressure during cycles of suction, compression, and discharge is known to affect a load torque. It is also known that the load torque associated with the refrigerant gas pressure varies in synchronism with the rotation of the compressor, resulting in periodic variations in rotation speed of the compressor. Such periodic variations in rotation speed of the compressor produce vibration in the compressor itself, and also cause noise.

To solve the problems such as vibration and noise caused by variations in load torque, various methods have been proposed. For example, there has been proposed a conventional method adopting torque control that estimates a variation component of a torque produced by a load device and compensates for the variation component thus estimated, wherein a current component for compensating for the variation component is limited by a limit value.

For example, in another conventional method, a torque variation component is extracted based on, for example, the deviation of the estimated motor speed from the specified motor speed value, and the extracted torque variation component is used to reduce vibration.

In addition to reducing vibration and noise of a device, reducing power consumption in a system for driving a motor is an important problem to be solved.

SUMMARY OF THE INVENTION

According to one aspect of the present invention, a motor control device performing vector control for a motor that drives a load whose load torque varies periodically is provided with: a motor speed deriving portion estimating or detecting a motor speed; a speed controller producing a specified torque current value such that the motor speed is made to follow a specified motor speed value fed from outside; a resonance filter producing a corrected torque current value by receiving a control value that varies with variations in the load torque and emphasizing a periodic variation component of the control value; a torque current corrector producing a specified superimposed torque current value by superimposing the corrected torque current value on the specified torque current value; and an adjusting portion adjusting, based on the specified superimposed torque current value, the phase of the corrected torque current value by controlling the resonance filter. Here, the vector control is performed according to the specified superimposed torque current value.

Specifically, for example, the control value is the difference between the motor speed and the specified motor speed value, or the control value is the specified torque current value.

Preferably, for example, let an axis parallel to a magnetic flux produced by a permanent magnet provided on a rotor of the motor be called a d-axis, and let an axis estimated for control purposes, the axis corresponding to the d-axis, be called a γ-axis. Then, the motor control device includes an estimator estimating, based on a motor current to be fed to the motor, an axis error between the d-axis and the γ-axis, and the motor speed. Here, the control value is the axis error, or a value varying in synchronism with variations in the axis error.

Specifically, for example, the adjusting portion adjusts the phase of the corrected torque current value based on a variation range of the specified superimposed torque current value.

Preferably, for example, the adjusting portion adjusts the phase of the corrected torque current value such that the variation range is reduced.

Preferably, for example, the adjusting portion extracts, from the specified superimposed torque current value, a frequency component of variations in the load torque, and adjusts the phase of the corrected torque current value based on the amplitude of the frequency component.

Preferably, for example, the adjusting portion adjusts the phase of the corrected torque current value such that the amplitude of the frequency component is reduced.

According to another aspect of the present invention, a motor control device performing vector control for a motor that drives a load whose load torque varies periodically, the motor control device is provided with: a motor speed deriving portion estimating or detecting a motor speed; a speed controller producing a specified torque current value such that the motor speed is made to follow a specified motor speed value fed from outside; a resonance filter producing a corrected torque current value by receiving a control value that varies with variations in the load torque and emphasizing a periodic variation component of the control value; a torque current collector producing a specified superimposed torque current value by superimposing the corrected torque current value on the specified torque current value; and an adjusting portion adjusting the phase of the corrected torque current value by controlling the resonance filter according to mode selection information indicating which control mode of a plurality of control modes is used to control the motor. Here, the vector control is performed according to the specified superimposed torque current value.

According to still another aspect of the present invention, a motor drive system is provided with: a motor; an inverter driving the motor; and any one of the motor control devices described above, the motor control devices performing vector control for the motor via the inverter.

According to still another aspect of the present invention, a compressor uses, as a drive source thereof, a torque of the motor provided in the motor drive system described above.

The significance and effect of the present invention will become more apparent from the following detailed description of an embodiment thereof. It is to be understood that the significance of the present invention and the significance of terms describing the component elements thereof are not limited in any way by those specifically described in the embodiment below, because the embodiment below is merely an example of how the invention can be implemented.

DETAILED DESCRIPTION OF PREFERRED EMBODIMENTS

Hereinafter, the present invention will be described by way of a specific embodiment with reference to the accompanying drawings. Among these drawings, such parts that appear more than once are identified with common reference designations, and in principle the description of any part, once given, will not be repeated. First, matters common to Examples 1 to 8, which will be described later, or matters to which reference is made in these examples will be described.

Figure 1:
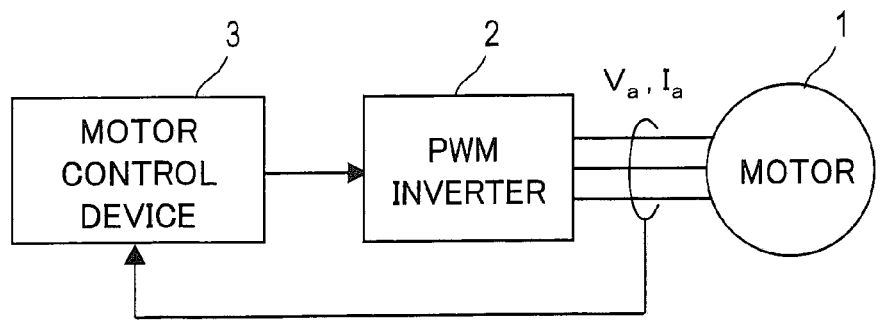
FIG. 1 is a schematic block diagram of a motor drive system embodying the invention.

FIG. 1 is a schematic block diagram of a motor drive system embodying the invention. The motor drive system shown in FIG. 1 includes a motor 1, a PWM (pulse width modulation) inverter 2, and a motor control device 3.

The motor 1 is a three-phase permanent-magnet synchronous motor provided with a rotor (unillustrated) having a permanent magnet and a stator (unillustrated) having armature windings, one for each of three phases.

The PWM inverter (hereinafter referred to simply as the "inverter") 2 supplies three-phase alternating-current voltages, consisting of U-phase, V-phase, and W-phase voltages, to the motor 1 according to the rotor position of the motor 1. These voltages supplied to the motor 1 are collectively referred to as the motor voltage (armature voltage) $V_a$, and the currents supplied from the inverter 2 to the motor 1 are collectively referred to as the motor current (armature current) $I_a$.

The motor control device 3 feeds the inverter 2 with a PWM signal for achieving desired vector control while referring to the detected motor current $I_a$ or the like.

Figure 2:
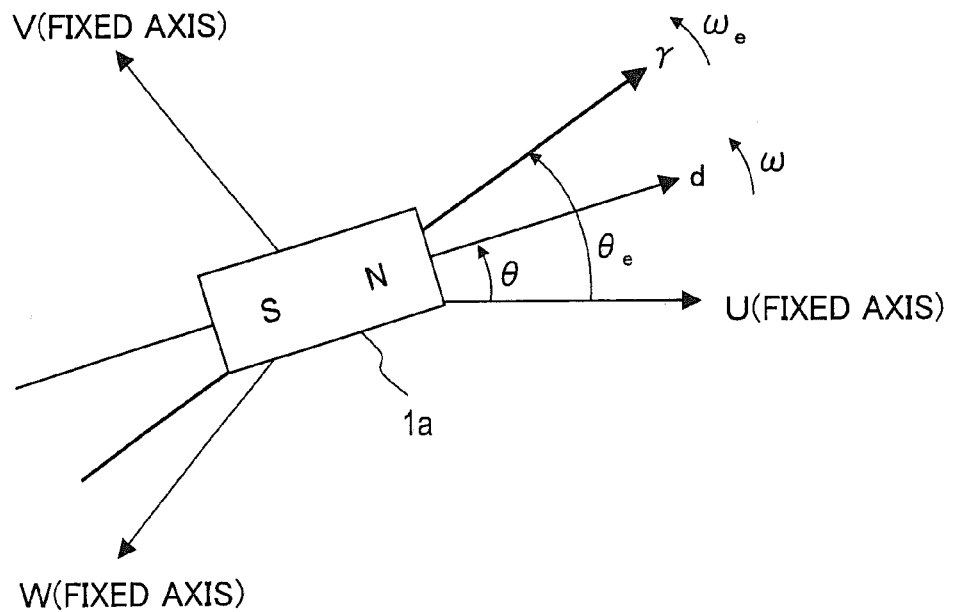
FIG. 2 is an analysis model diagram of the motor shown in FIG. 1.

FIG. 2 is an analysis model diagram of the motor 1. In the following description, what is referred to simply by the "armature winding" should be understood to mean the armature winding provided on the motor 1. FIG. 2 shows the U-phase, V-phase, and W-phase armature winding fixed axes. Reference numeral 1a represents the permanent magnet constituting the rotor of the motor 1. In a rotating coordinate system that rotates at the same speed as the magnetic flux produced by the permanent magnet 1a, the direction of the magnetic flux produced by the permanent magnet 1a is referred to as the d-axis, and the rotation axis for control purposes, the rotation axis corresponding to the d-axis, is referred to as the γ-axis. Though not illustrated, the axis having a phase leading the d-axis by an electrical angle of 90 degrees is referred to as the q-axis, and the axis having a phase leading the γ-axis by an electrical angle of 90 degrees is referred to as the δ-axis. The rotating coordinate system corresponding to the real axes has the d- and q-axes as its coordinate axes, and its coordinate axes are called the d-q axes. The rotating coordinate system for control purposes has the γ- and δ-axes as its coordinate axes, and its coordinate axes are called the γ-δ axes.

The d-q axes rotates, and its rotation speed is represented by ω. The γ-δ axes also rotates, and its rotation speed is represented by $ω_e$. With respect to the d-q axes, the angle (phase) of the d-axis is represented, relative to the U-phase armature winding fixed axis, by θ. Likewise, with respect to the γ-δ axes, the angle (phase) of the γ-axis is represented, relative to the U-phase armature winding fixed axis, by $θ_e$. The angle represented by θ or $θ_e$ is the angle in electrical angle, and is commonly referred to as a rotor position or a magnetic pole position. The rotation speed represented by ω or $ω_e$ is the angular velocity at electrical angle.

Hereinafter, θ nor $θ_e$ is referred to as a rotor position, and ω or $ω_e$ is referred to as a motor speed. In a case where the rotor position and the motor speed are derived by estimation, as in Example 1 or the like, which will be described later, the γ- and δ-axes can be called the axes estimated for control purposes.

Although the motor control device 3 basically performs vector control such that θ becomes equal to $θ_e$, it sometimes intentionally makes θ different from $θ_e$. When θ is equal to $θ_e$, the d-axis and the q-axis are equal to the γ-axis and the δ-axis, respectively.

In the following description, the γ-axis component and the δ-axis component of the motor voltage $V_a$ are referred to as the γ-axis voltage $v_γ$ and the δ-axis voltage $v_δ$, respectively, and the γ-axis component and the δ-axis component of the motor current $I_a$ are referred to as the γ-axis current $i_γ$ and the δ-axis current $i_δ$, respectively.

The specified voltage values, or target values, of the γ-axis voltage $v_γ$ and the δ-axis voltage $v_δ$ are referred to as the specified γ-axis voltage value $v_γ*$ and the specified δ-axis voltage value $v_δ*$, respectively. The specified current values, or target values, of the γ-axis current $i_γ$ and the δ-axis current $i_δ$ are referred to as the specified γ-axis current value $i_γ*$ and the specified δ-axis current value $i_δ*$, respectively. Here, $v_γ*$ can be called a target γ-axis voltage of $v_γ$, and $v_δ*$ can be called a target δ-axis voltage of $v_δ$; $i_γ*$ can be called a target γ-axis current of $i_γ$, and $i_δ*$ can be called a target δ-axis current of $i_δ$.

The motor control device 3 performs vector control such that the values of γ-axis voltage $v_γ$ and δ-axis voltage $v_δ$ are made to follow the specified γ-axis voltage value $v_γ*$ and the specified δ-axis voltage value $v_δ*$, respectively, and such that the values of γ-axis current $i_γ$ and δ-axis current $i_δ$ are made to follow the specified γ-axis current value $i_γ*$ and the specified δ-axis current value $i_δ*$, respectively.

U-, V-, and W-phase components of the motor voltage $V_a$ are represented by the specified three-phase voltage values consisting of a specified U-phase voltage value $v_u*$, a specified V-phase voltage value $v_v*$, and a specified W-phase voltage value $v_w*$.

In the following description, $R_a$ represents the motor resistance (the resistance value of the armature winding of the motor 1), and $L_d$ and $L_q$ represent the d-axis inductance (the d-axis component of the inductance of the armature winding of the motor 1) and the q-axis inductance (the q-axis component of the inductance of the armature winding of the motor 1), respectively. The values of $R_a$, $L_d$, and $L_q$ are determined at the time of fabrication of the motor drive system, and are used by the motor control device 3 to perform calculations.

In the present specification, to make the description simple, state quantities and the like are often referred to by their symbols (such as $i_γ$) alone; for example, the "γ-axis current $i_γ$," is sometimes referred to simply by "$i_γ$", and these should be understood to represent the same thing. In addition, the terms representing the state quantities, such as "current", "voltage", and "speed", represent in principle the values of these state quantities. That is, for example, the "γ-axis current $i_γ$" means the current value of the γ-axis current (however, the wording such as "the value of the γ-axis current $i_γ$" may be sometimes used).

The motor 1 drives and rotates a load whose load torque varies periodically. This load is, for example, a load factor provided in a compressor (see FIG. 13), a washing machine (unillustrated), a drying machine (unillustrated), or the like. The compressor is used in an air conditioner or the like. In the compressor, a change in refrigerant gas pressure during periodic cycles of suction, compression, and discharge affects a load torque, resulting in periodic variations in load torque.

Specifically, the washing machine or the drying machine is, for example, a drum washing machine or a drum drying machine. In the drum washing machine, a drum inside which laundry is placed rotates about a rotation axis that is not parallel to the vertical line, such that the laundry is lifted up and then dropped to remove a stain. In a case where the drum is a load of the motor 1, the load torque becomes relatively large when the laundry is lifted up; otherwise it becomes relatively small. This results in periodic variations in load torque. The same holds true for the drum drying machine.

Example 1

Figure 3:
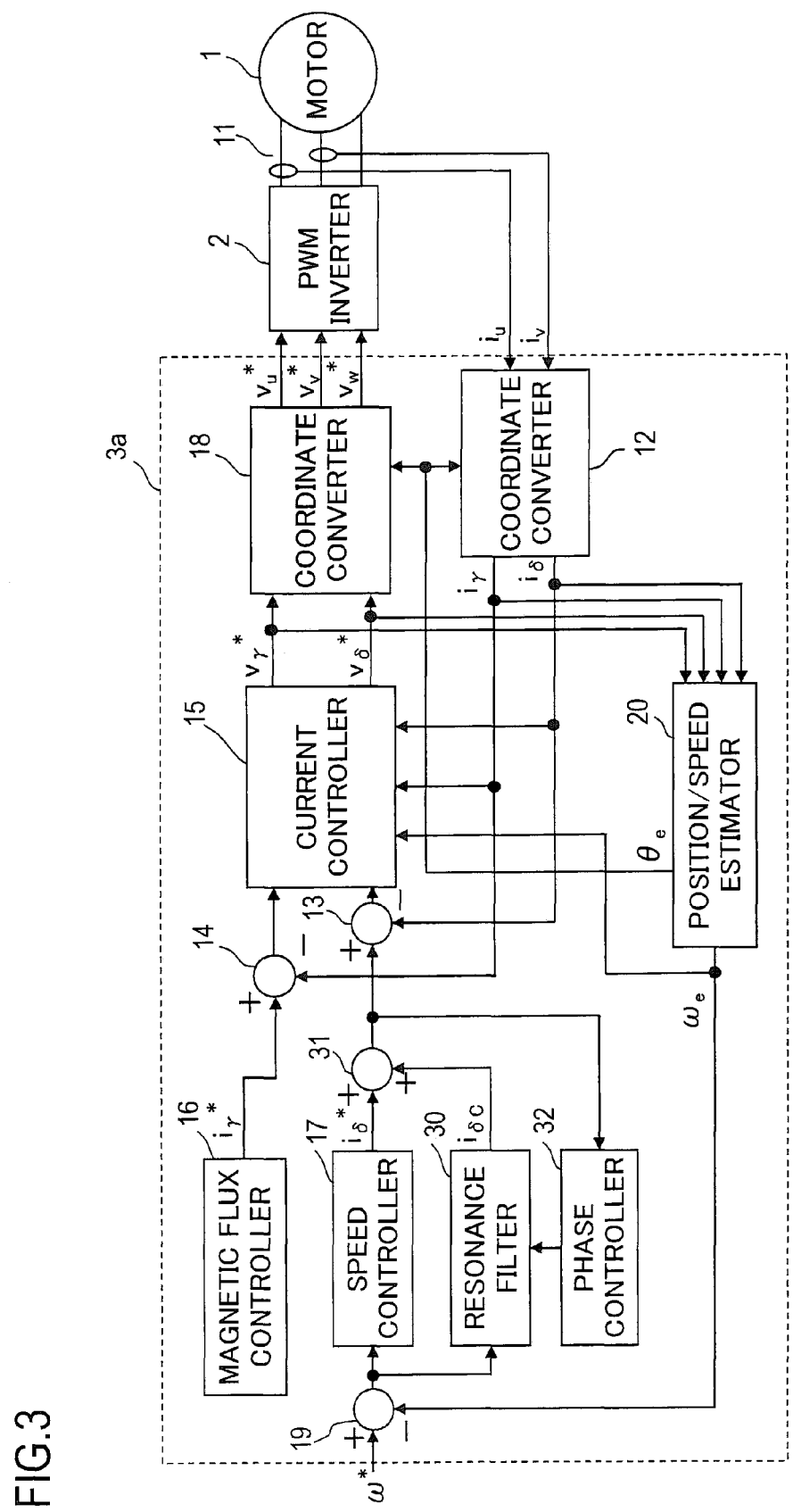
FIG. 3 is a detailed block diagram of a motor drive system according to Example 1 of the invention.

First, Example 1 of the invention will be described. FIG. 3 is a detailed block diagram of a motor drive system according to Example 1. The motor drive system shown in FIG. 3 includes the motor 1 and the inverter 2 shown in FIG. 1, a motor control device 3a serving as the motor control device 3 shown in FIG. 1, and a phase-current sensor 11. The motor control device 3a includes different parts designated with reference numerals 12 to 20 and 30 to 32. The motor control device 3a can be considered to include the phase-current sensor 11. The different parts constituting the motor control device 3a can freely use all the values produced within the motor control device 3a.

The different parts constituting the motor drive systems of this example and other examples, which will be described later, update, at intervals of a predetermined period, the specified values (including $i_γ*$, $i_δ*$, $v_γ*$, $v_δ*$, $v_u*$, $v_v*$, and $v_w*$), the state quantities (including $i_u$, $i_v$, $i_γ$, $i_δ$, $θ_e$, and $ω_e$), or the corrected δ-axis current value $i_{δC}$, which are calculated (or detected) thereby and outputted therefrom.

The phase-current sensor 11 detects a U-phase current $i_u$ and a V-phase current $i_v$ which are the fixed-axis components of the motor current $I_a$ supplied from the inverter 2 to the motor 1. It is to be noted that a W-phase current $i_w$ is calculated by using the following relational expression: $i_w = -i_u - i_v$. Here, $i_u$, $i_v$, and $i_w$ are currents of the U-, V-, and W-phase armature windings, respectively, of the stator of the motor 1.

The coordinate converter 12 performs coordinate conversion based on the rotor position $θ_e$ so that the U-phase current $i_u$ and the V-phase current $i_v$ are converted into those on the γ-δ axes, and thereby calculates the γ-axis current $i_γ$ and the δ-axis current $i_δ$ and outputs them. In Example 1, the rotor position $θ_e$ is calculated by the position/speed estimator 20.

The subtracter 19 refers to the motor speed $ω_e$ and the specified motor speed value $ω*$ from a specified motor speed value producing portion (unillustrated) provided outside the motor control device 3a, and calculates the speed deviation $(ω* - ω_e)$ between them. In Example 1, the motor speed $ω_e$ is calculated by the position/speed estimator 20.

The speed controller 17 calculates the specified δ-axis current value $i_δ*$ by using proportional-plus-integral control or the like, such that the speed deviation $(ω* - ω_e)$ converges to zero, and outputs the specified δ-axis current value $i_δ*$ thus calculated. The adder 31 adds the corrected δ-axis current value $i_{δC}$ from the resonance filter 30 to $i_δ*$ from the speed controller 17, and outputs the value $(i_δ* + i_{δC})$ obtained by the addition to the subtracter 13. The value $(i_δ* + i_{δC})$ is also given to the phase controller 32. Originally, $i_δ*$ serves as a target value of $i_δ$; in actuality, the value $(i_δ* + i_{δC})$ obtained by correcting $i_δ*$ with the resonance filter 30 and the adder 31 serves as a target value of $i_δ$. Operations of the resonance filter 30 and the phase controller 32 will be described later.

The magnetic flux controller 16 determines the specified γ-axis current value $i_γ*$, and outputs it to the subtracter 14. Here, $i_γ*$ can take on different values in accordance with the type of vector control performed in the motor drive system and the motor speed. In this example, the d-q axes are estimated. Therefore, in a case where control for making the d-axis current equal to zero is performed, $i_γ* = 0$ holds. In a case where maximum torque control or flux-weakening control is performed, $i_γ*$ takes on a negative value commensurate with the motor speed $ω_e$. The operations of the resonance filter 30 and the phase controller 32, which are distinctive parts of the motor control device 3a, do not depend on the value of $i_γ*$. The following description deals with a case in which $i_γ* = 0$.

The subtracter 14 subtracts the γ-axis current $i_\gamma$ outputted from the coordinate converter 12 from the specified γ-axis current value $i_\gamma$* outputted from the magnetic flux controller 16, and thereby calculates the current error ($i_\gamma$*−$i_\gamma$). The subtracter 13 subtracts the δ-axis current $i_\delta$ outputted from the coordinate converter 12 from the value ($i_\delta$*+$i_{\delta C}$) outputted from the adder 31, and thereby calculates the current error ($i_\delta$*+$i_{\delta C}$−$i_\delta$).

The current controller 15 performs current feedback control by using proportional-plus-integral control or the like, such that the current errors ($i_\gamma$*−$i_\gamma$) and ($i_\delta$*+$i_{\delta C}$−$i_\delta$) converge to zero. At this point, the specified γ-axis voltage value $v_\gamma$* and the specified δ-axis voltage value $v_\delta$* are calculated by using decoupling control for eliminating interference between the γ- and δ-axes, such that ($i_\gamma$*−$i_\gamma$) and ($i_\delta$*+$i_{\delta C}$−$i_\delta$) converge to zero. It is to be noted that $\omega_e$, $i_\gamma$, and $i_\delta$ can also be referred to at the time of calculation of $v_\gamma$* and $v_\delta$*.

The coordinate converter 18 performs coordinate conversion based on the rotor position $\theta_e$ outputted from the position/speed estimator 20 so that $v_\gamma$* and $v_\delta$* fed from the current controller 15 are converted into those on the three-phase fixed coordinate axes, and thereby calculates the specified three-phase voltage values ($v_u$*, $v_v$*, and $v_w$*) and outputs them.

An unillustrated PWM converter produces a PWM signal subjected to pulse width modulation in accordance with the specified three-phase voltage values ($v_u$*, $v_v$*, and $v_w$*). The inverter 2 supplies the motor current $I_a$ corresponding to the PWM signal to the motor 1 to drive it. More specifically, the inverter 2 includes three half-bridge circuits provided one for each of three phases and a driver, all of which are not shown in the drawing, and the driver performs on/off control for the switching devices of the half-bridge circuits in accordance with the PWM signal, such that the motor current $I_a$ according to the specified three-phase voltage values is supplied to the motor 1. The PWM converter is provided in the motor control device 3a; however, it can be considered to be provided in the inverter 2.

The position/speed estimator 20 performs proportional-plus-integral control or the like by using all or part of $i_\gamma$ and $i_\delta$ from the coordinate converter 12 and $v_\gamma$* and $v_\delta$* from the current controller 15, and thereby estimates the rotor position $\theta_e$ and the motor speed $\omega_e$ such that the axis error Δθ (see FIG. 2; Δθ=θ−$\theta_e$) between the d-axis and the γ-axis converges to zero. There have conventionally been proposed various methods for estimating the rotor position $\theta_e$ and the rotation speed $\omega_e$, and any method heretofore known can be adopted in the position/speed estimator 20.

Figure 4:
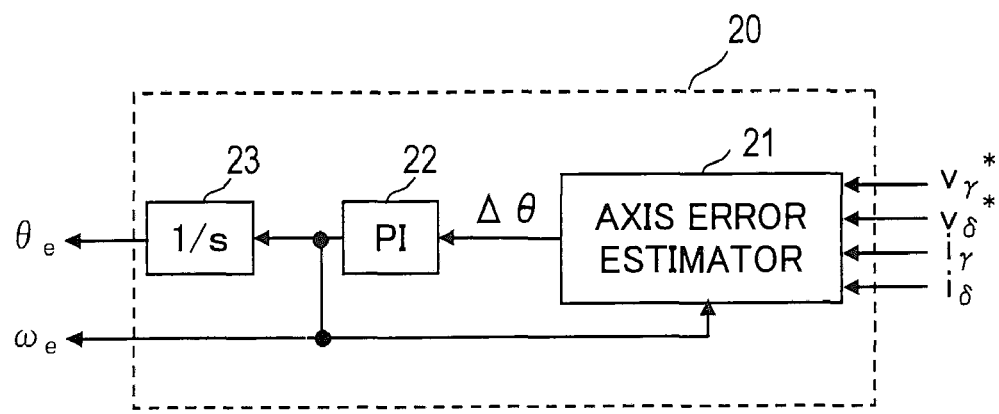
FIG. 4 is an internal block diagram of the position/speed estimator shown in FIG. 3.

FIG. 4 shows an example of an internal block diagram of the position/speed estimator 20. The position/speed estimator 20 shown in FIG. 4 includes different parts designated with reference numerals 21 to 23. The axis error estimator 21 calculates the axis error Δθ based on $i_\gamma$, $i_\delta$, $v_\gamma$*, and $v_\delta$*. For example, the axis error Δθ is calculated by using formula (1) below, which is disclosed also in JP-B-3411878. To achieve PLL (phase locked loop) control, the proportional-plus-integral calculator 22 performs proportional-plus-integral control to calculate the motor speed $\omega_e$ such that the axis error Δθ calculated by the axis error estimator 21 converges to zero. The integrator 23 integrates the motor speed $\omega_e$, and thereby calculates the rotor position $\theta_e$. The calculated $\theta_e$ and $\omega_e$ are fed to different parts of the motor control device 3a that need them.

$$\Delta\theta = \tan^{-1}\left(\frac{-(v_\gamma^* - R_a i_\gamma + \omega_e L_q i_\delta)}{v_\delta^* - R_a i_\delta - \omega_e L_q i_\gamma}\right) \quad (1)$$

As described above, in this embodiment, it is assumed that the motor 1 drives and rotates a load whose load torque varies periodically. As a result, $i_\delta$* may deviate from the ideal value due to variations in load torque. However, the resonance filter 30 and the adder 31 operate so as to prevent such a deviation.

Figure 5:
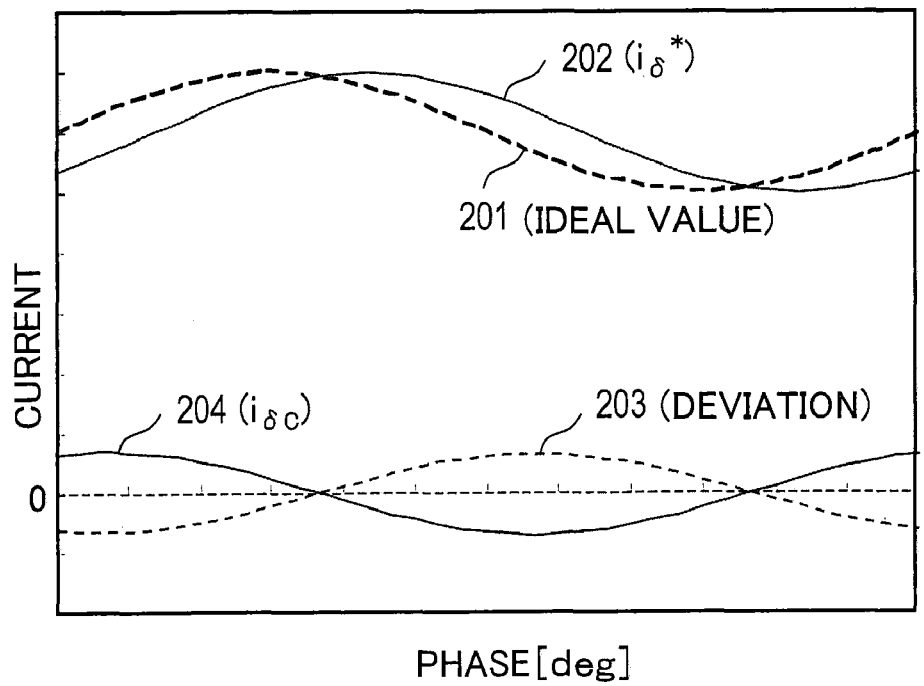
FIG. 5 is a diagram according to Example 1 of the invention, showing the waveforms of a current conversion value of a load torque, a specified δ-axis current value, an error between the current conversion value of a load torque and the specified δ-axis current value, and a corrected δ-axis current value.

With reference to FIG. 5 and other drawings, the principle of preventing such a deviation will be explained. In FIG. 5, the horizontal axis represents the phase of current in electrical angle, and the vertical axis represents the current value. Since the phase of current changes with time during normal rotation of the motor 1, the horizontal axis of FIG. 5 also represents time. In FIG. 5, a curve 201 represents the current conversion value (current component) of a load torque, a curve 202 represents the specified δ-axis current value $i_\delta$* calculated by the speed controller 17, and a curve 203 represents a waveform of error between the current conversion value of a load torque represented by the curve 201 and the specified δ-axis current value $i_\delta$* represented by the curve 202. A curve 204 represents a waveform obtained by inverting the waveform of error represented by the curve 203, and also represents a waveform of the corrected δ-axis current value $i_{\delta C}$ calculated by the resonance filter 30.

To make the motor 1 produce a torque identical to a load torque, it is necessary simply to pass the δ-axis current $i_\delta$ corresponding to the current conversion value of a load torque. Assume that no corrected δ-axis current value $i_{\delta C}$ is present. Then, if the current conversion value of a load torque is identical to $i_\delta$*, it is possible to suppress variations in speed caused by variations in load torque, and to reduce vibration and noise.

In actuality, however, due to delay in the control system, the specified δ-axis current value $i_\delta$* lags behind the value required to be calculated (the current conversion value of a load torque). To deal with this problem, in this example, the corrected δ-axis current value $i_{\delta C}$ corresponding to the curve 204 is superimposed on $i_\delta$*, such that ($i_\delta$*+$i_{\delta C}$) is made identical to the current conversion value of a load torque. To make ($i_\delta$*+$i_{\delta C}$) identical to the current conversion value of a load torque requires the optimization of the phase and amplitude of $i_{\delta C}$. In this example, the phase controller 32 (FIG. 3) is used to make adjustment for the optimization of the phase. The function of the phase controller 32 is described later. First, the function of the resonance filter 30 will be described.

The resonance filter 30 receives a subtraction result (ω*−$\omega_e$) of the subtracter 19 as an input signal, and extracts from the input signal thus received a periodic variation component resulting from variations in load torque. Then, the resonance filter 30 outputs the extracted variation component as $i_{\delta C}$. The transfer function $H_A(s)$ of the resonance filter 30 is given by formula (2) below (or formula (3), which will be described later).

$$H_A(s) = (b_0 + b_1 s)/(s^2 + 2\zeta\omega_r s + \omega_r^2) \quad (2)$$

Here, $b_0$ represents a gain coefficient, $b_1$ represents a phase adjusting value, ζ represents an attenuation coefficient, and $\omega_r$ represents a natural angular frequency. In addition, s represents the Laplace operator. Ideally, the resonance filter 30 extracts only a frequency component of $\omega_r$ of the input signal, and outputs it.

Figure 6A:
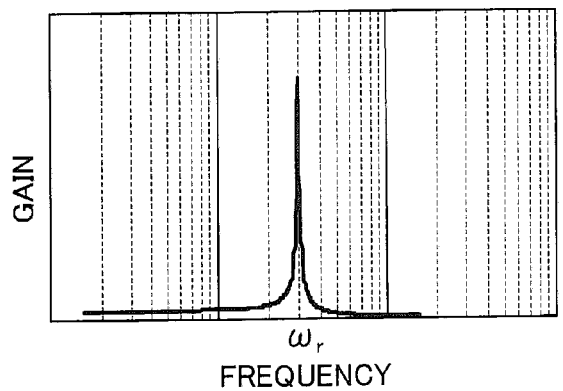
FIG. 6A is a diagram showing gain characteristics of the resonance filter shown in FIG. 3.
Figure 6B:
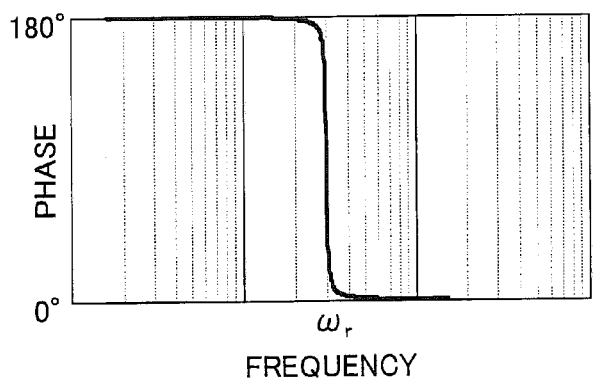
FIG. 6B is a diagram showing phase characteristics of the resonance filter shown in FIG. 3.

FIG. 6A shows the gain characteristics of the resonance filter 30. The resonance filter 30 amplifies (emphasizes) a component of natural angular frequency $\omega_r$ contained in the input signal to a degree commensurate with the gain coefficient $b_o$, and outputs it. At this time, the resonance filter 30 makes the output signal contain as few as possible a frequency component other than $\omega_r$. FIG. 6B shows the phase characteristics of the resonance filter 30. The resonance filter 30 gives the component of natural angular frequency $\omega_r$ a phase lead of 90 degrees or more, and gives a component having a frequency lower than the natural angular frequency $\omega_r$ 180 degrees phase lead. It is possible to adjust the amount of phase lead the resonance filter 30 gives the component of natural angular frequency $\omega_r$. The phase of a component having a frequency higher than the natural angular frequency $\omega_r$ is identical between the input and output signals of the resonance filter 30.

The natural angular frequency $\omega_r$ is set so as to be identical (or as identical as possible) to the angular frequency of periodic load torque variations of the load of the motor 1. The value of the natural angular frequency $\omega_r$ is made to change according to the specified motor speed value $\omega^*$ or the value of the motor speed $\omega_e$, because the period of the load torque variations changes according to the rotational speed of the motor 1. How to set the natural angular frequency $\omega_r$ according to the specified motor speed value $\omega^*$ or the value of the motor speed $\omega_e$ is previously defined at the design stage of the motor drive system. For example, the motor control device 3a is previously provided with the table data for determining $\omega_r$ based on $\omega^*$ or $\omega_e$.

The attenuation coefficient $\zeta$ is a value for determining the degree of resonance (resonance characteristics) of the resonance filter 30, and can take on any value as long as $0 \leq \zeta < 1$. For example, $\zeta = 0.01$ or $\zeta = 0.1$. The attenuation coefficient $\zeta$ can be previously determined at the design stage of the motor drive system.

The phase adjusting value $b_1$ is a value for adjusting the phase of the corrected $\delta$-axis current value $i_{\delta C}$. Changing the phase adjusting value $b_1$ causes the curve 204 shown in FIG. 5 to shift in the horizontal direction.

The gain of the resonance filter 30, that is, the degree of emphasis placed on the component of natural angular frequency $\omega_r$ contained in the input signal of the resonance filter 30, is determined by the gain coefficient $b_o$. More specifically, if $b_1 = 0$, the gain of the resonance filter 30 can be changed by changing $b_o$ in formula (2) above. If $b_1 \neq 0$, the gain of the resonance filter 30 can be changed by rearranging formula (2) above into formula (3) below, and changing $b_o$ in formula (3). The gain coefficient $b_o$ changes according to the specified motor speed value $\omega^*$ or the value of the motor speed $\omega_e$. How to set the gain coefficient $b_o$ according to the specified motor speed value $\omega^*$ or the value of the motor speed $\omega_e$ is previously defined at the design stage of the motor drive system. For example, the motor control device 3a is previously provided with the table data for determining $b_o$ based on $\omega^*$ or $\omega_e$.

$$H_A(s) = b_0(1 + b_1 s/b_0)/(s^2 + 2\zeta\omega_r s + \omega_r^2) \qquad (3)$$

Figure 7:
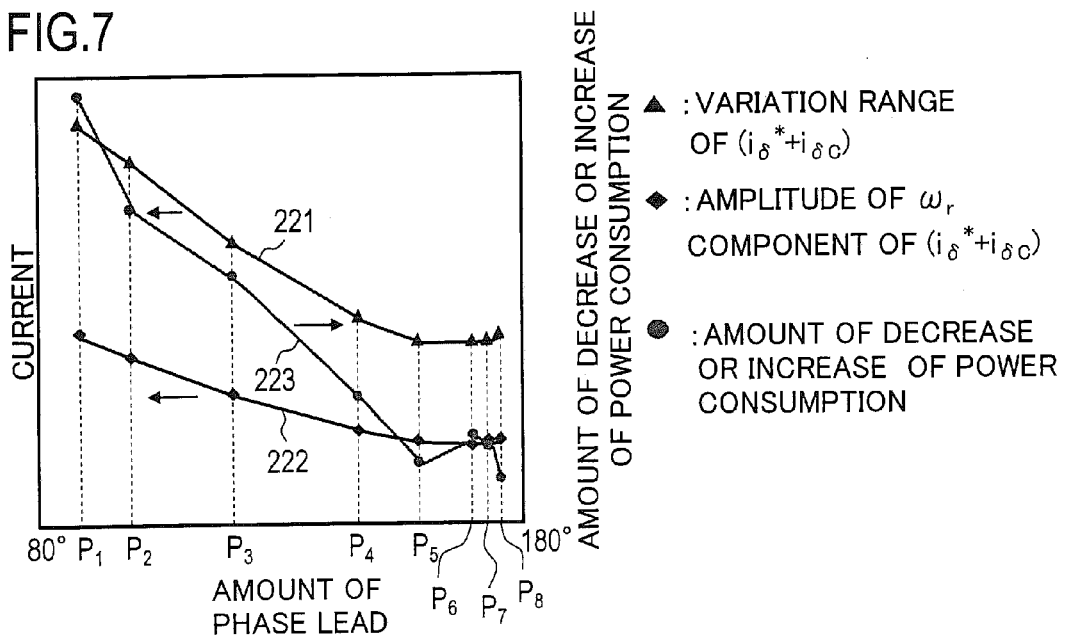
FIG. 7 is a diagram showing the measurement results of the variation range of ($i_δ^*+i_{δC}$), the amplitude of a first-order component of ($i_δ^*+i_{δC}$), and the amount of decrease or increase of power consumption, the measurement results being obtained when the phase characteristics of the resonance filter shown in FIG. 3 are variously changed.

FIG. 7 shows the measurement results (experimental results) of the variation range of $(i_\delta^* + i_{\delta C})$, the amplitude of a first-order component of $(i_\delta^* + i_{\delta C})$, and the amount of decrease or increase of power consumption, the measurement results being obtained when the phase characteristics of the resonance filter 30 are variously changed. The resonance filter 30 amplifies the component of natural angular frequency $\omega_r$ contained in the input signal while giving it a phase lead of 90 to 180 degrees, and outputs it. In FIG. 7, the horizontal axis represents the amount of phase lead given to the component $\omega_r$ by the resonance filter 30. In FIG. 7, the far-left and far-right portions of the horizontal axis correspond to 80 and 180 degrees, respectively. For polygonal lines 221 and 222, the vertical axis represents the current value; for a polygonal line 223, the vertical axis represents the amount of decrease or increase of power consumption. In the following description, what is referred to simply as the "amount of phase lead" always refers to the amount of phase lead given to the component $\omega_r$ by the resonance filter (in this example, the resonance filter 30). In addition, what is referred to simply as the "gain" always refers to that of the resonance filter (in this example, the resonance filter 30). Furthermore, what is referred to simply as the "power consumption" always refers to that of the motor drive system according to an embodiment.

In the experiment corresponding to FIG. 7, the amount of phase lead was changed in eight levels by changing the amount of phase adjustment $b_1$ (that is, the phase of the corrected $\delta$-axis current value $i_{\delta C}$ was changed in eight levels). The eight levels of the amount of phase lead are referred to, in order of increasing amount, as $P_1, P_2, P_3, P_4, P_5, P_6, P_7,$ and $P_8$. With other conditions fixed, the amount of phase lead is uniquely determined by setting the amount of phase adjustment $b_1$. It is to be noted that $P_1, P_2, P_3, P_4, P_5, P_6, P_7,$ and $P_8$ are approximately 90, 100, 120, 145, 160, 170, 172, and 175 degrees, respectively.

The polygonal line 221 shows the experimental result indicating the dependence of the variation range of $(i_\delta^* + i_{\delta C})$ on the amount of phase lead. The variation range of $(i_\delta^* + i_{\delta C})$ is the difference (in this case, the difference is a positive value) between the minimum and maximum values of $(i_\delta^* + i_{\delta C})$ observed while the motor 1 rotates one-turn in mechanical angle. The polygonal line 222 shows the experimental result indicating the dependence of the amplitude of the first-order component of $(i_\delta^* + i_{\delta C})$ on the amount of phase lead. The amplitude of the first-order component of $(i_\delta^* + i_{\delta C})$ is the amplitude of a frequency component of $\omega_r$ of $(i_\delta^* + i_{\delta C})$. The polygonal line 223 shows the experimental result indicating the dependence of the amount of decrease or increase of power consumption on the amount of phase lead, the amount of decrease or increase of power consumption relative to power consumption observed when the gain is zero (that is, $b_o = 0$). A state in which the gain is zero is equivalent to a state in which no resonance filter 30 is provided. It is to be noted that the experiments corresponding to the polygonal lines 221 to 223 were performed with the conditions (such as $b_0$ and $\omega^*$) other than the amount of phase lead fixed at constant values.

As will be understood from FIG. 7, as the amount of phase lead increases from 90 to 180 degrees, the variation range of $(i_\delta^* + i_{\delta C})$ and the amplitude of the first-order component of $(i_\delta^* + i_{\delta C})$ basically decrease; however, they are maintained largely constant when the amount of phase lead falls with the range from $P_5$ to $P_8$.

The amount of decrease or increase of power consumption behaves in a similar way. That is, as the amount of phase lead increases from 90 to 180 degrees, power consumption basically decreases; however, it is maintained largely constant when the amount of phase lead falls with the range from $P_5$ to $P_8$. These experimental results revealed that an increase in the amount of phase lead in the range from 90 to 180 degrees basically contributes to reduction in power consumption.

Figure 8:
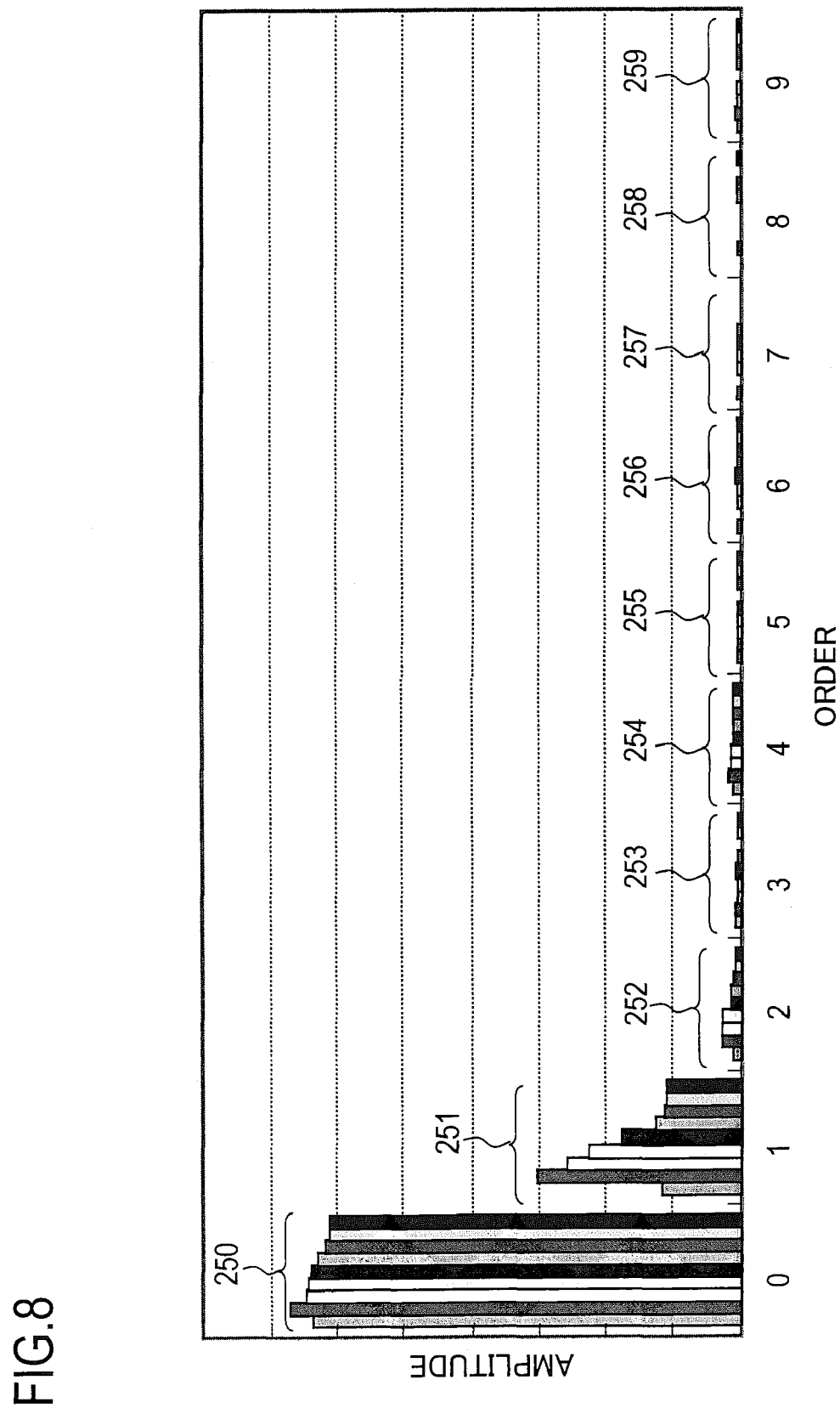
FIG. 8 is a diagram showing the FFT analysis results of ($i_δ^*+i_{δC}$) inputted to the phase controller shown in FIG. 3.
Figure 9:
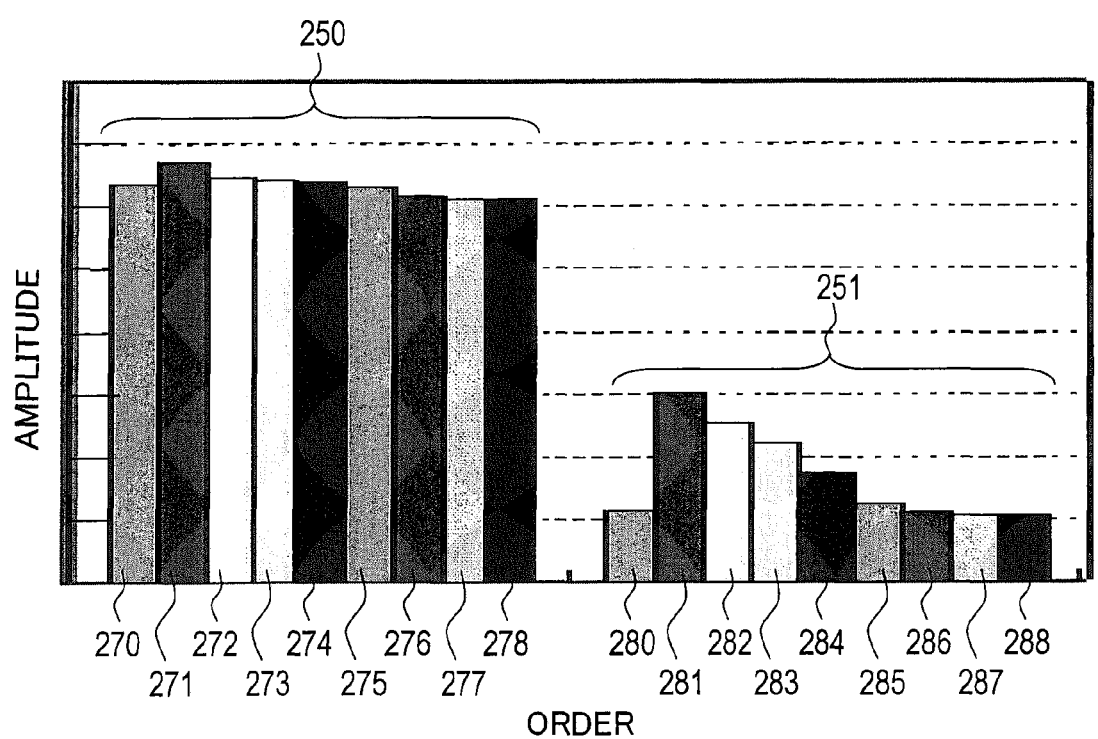
FIG. 9 is an enlarged view of part of FIG. 8, showing the FFT analysis results of ($i_δ^*+i_{δC}$) inputted to the phase controller shown in FIG. 3.

FIGS. 8 and 9 show FFT (fast Fourier transform) analysis results of $(i_\delta^* + i_{\delta C})$ corresponding to the experiments shown in FIG. 7. In FIGS. 8 and 9, the horizontal axis represents the order, and the vertical axis represents the amplitude of each order component. FIG. 9 is an enlarged view of zeroth- and first-order parts of FIG. 8. In FIG. 8, bar groups marked with reference numerals 250, 251, 252, 253, 254, 255, 256, 257, 258, and 259 respectively represent the amplitudes of zeroth-, first-, second-, third-, fourth-, fifth-, sixth-, seventh-, eighth-, and ninth-order components of $(i_\delta^* + i_{\delta C})$. The zeroth-order component of $(i_\delta^* + i_{\delta C})$ is a direct current component of $(i_\delta^* + i_{\delta C})$, and the jth-order component (where j is an integer from 1 to 9) of $(i_\delta^* + i_{\delta C})$ is a frequency component of $(\omega_r \times j)$ of $(i_\delta^* + i_{\delta C})$.

Each bar group consists of nine bars. In each bar group, the height of the leftmost bar represents the amplitude observed when the gain is zero. Also, in each bar group, the second to ninth bars from the left each represent the amplitude observed when a constant gain, which is not zero, is given, and, the closer to the right a bar is located, the greater the corresponding amount of phase lead. That is, in FIG. 9, the heights of bars 271, 272, 273, 274, 275, 276, 277, and 278 represent the amplitudes of the zeroth-order component of $(i_{\delta^*+i\delta C})$ observed when the amount of phase lead is $P_1$, $P_2$, $P_3$, $P_4$, $P_5$, $P_6$, $P_7$, and $P_8$, respectively, and the heights of bars 281, 282, 283, 284, 285, 286, 287, and 288 represent the amplitudes of the first-order component of $(i_\delta^* + i_{\delta C})$ observed when the amount of phase lead is $P_1$, $P_2$, $P_3$, $P_4$, $P_5$, $P_6$, $P_7$, and $P_8$ respectively. In addition, the height of the bar 270 represents the amplitude of the zeroth-order component of $(i_\delta^* + i_{\delta C})$ observed when the gain is zero, and the height of the bar 280 represents the amplitude of the first-order component of $(i_\delta^* + i_{\delta C})$ observed when the gain is zero.

These figures show the following points. As the amount of phase lead increases from $P_1$ to $P_8$, the amplitude of the first-order component of $(i_\delta^* + i_{\delta C})$ decreases. Although the amplitude of the zeroth-order component of $(i_\delta^* + i_{\delta C})$ also decreases as the amount of phase lead increases from $P_1$ to $P_8$, the extent of decrease of the amplitude of the zeroth-order component is smaller than that of the first-order component. In addition, the amplitude of a second- and higher order component is considerably small as compared with the amplitudes of the zeroth- and first-order components.

Since the main cause for variations in torque-related $\delta$-axis current is variations in load torque, and the frequency of the variations is $\omega_r$, the power consumption is considered to be minimized by minimizing the amplitude of the first-order component of $(i_\delta^* + i_{\delta C})$.

Although the power consumption is most strongly influenced by the direct current component of $(i_\delta^* + i_{\delta C})$, as is clear from FIGS. 8 and 9, since the amount of variations in frequency components of $(i_\delta^* + i_{\delta C})$ other than the first-order component is small, variations in the first-order component is the dominant factor in variations in $(i_\delta^* + i_{\delta C})$ itself, which corresponds to a product obtained by combining all the order components. As a result, the amount of phase lead with which the amplitude of the first-order component of $(i_\delta^* + i_{\delta C})$ is minimized is in general considered to be identical to the amount of phase lead with which the variation range of $(i_\delta^* + i_{\delta C})$ is minimized. Therefore, minimization of power consumption may be achieved by minimizing the variation range of $(i_\delta^* + i_{\delta C})$, instead of minimizing the amplitude of the first-order component of $(i_\delta^* + i_{\delta C})$.

In general, $i_\gamma^* = 0$ and $i_\delta^* \gg i_\gamma^*$, and a power loss of the motor drive system is roughly proportional to the square of the $\delta$-axis current $i_\delta$ ($\approx i_\delta^* + i_{\delta C}$). Suppose a direct current component of $i_\delta$ is constant. Then, as is clear from a general relational expression (4), power consumption is minimized when $i_\delta$ has only a direct current component, and power consumption increases with an increase in the variation range of $i_\delta$ (strictly speaking, however, power consumption is also influenced by a phase relationship between voltage and current). Thus, by minimizing the variation range of $(i_\delta^* + i_{\delta C})$ or the amplitude of the first-order component of $(i_\delta^* + i_{\delta C})$, it is possible to minimize power consumption.

$$\int_0^{2\pi} 1^2 dx < \int_0^{2\pi} (1+\sin x)^2 dx \quad (4)$$

The above-described method for minimizing power consumption is applied to the motor control device 3a shown in FIG. 3. Specifically, the phase controller 32 shown in FIG. 3 calculates, based on $(i_\delta^* + i_{\delta C})$ outputted from the adder 31, the amount of phase adjustment $b_1$ for minimizing the variation range of $(i_\delta^* + i_{\delta C})$ or the amplitude of the first-order component of $(i_\delta^* + i_{\delta C})$. The resonance filter 30 calculates the corrected $\delta$-axis current value $i_{\delta C}$ by using the amount of phase adjustment $b_1$ thus calculated, and outputs the corrected $\delta$-axis current value $i_{\delta C}$. As described above, the phase controller 32 adjusts the phase of the corrected $\delta$-axis current value $i_{\delta C}$ by controlling the resonance filter 30 (specifically, by adjusting $b_1$), thereby achieving minimization of power consumption.

Figure 10:
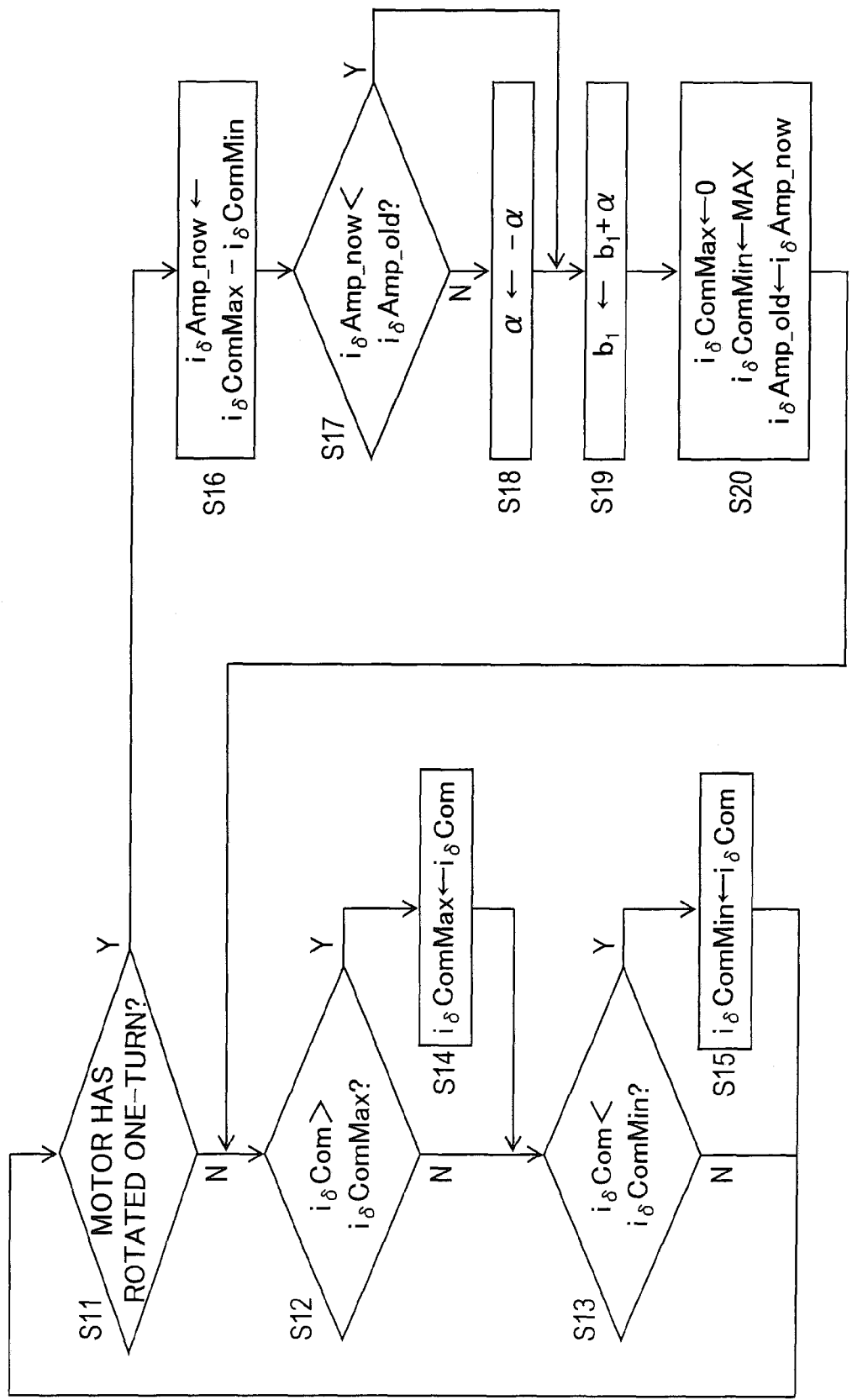
FIG. 10 is a flow chart showing the procedure for minimizing the variation range of ($i_δ^*+i_{δC}$) inputted to the phase controller shown in FIG. 3.

A method for minimizing the variation range of $(i_\delta^* + i_{\delta C})$ will be explained with reference to FIG. 10. FIG. 10 is a flow chart showing the procedure for minimizing the variation range of $(i_\delta^* + i_{\delta C})$. This procedure is based on a so-called hill-climbing algorithm.

At the time of execution of this procedure, the most current value of $(i_\delta^* + i_{\delta C})$ is successively assigned to a variable $i_\delta$Com. In addition, a variable $i_\delta$ComMax to which a maximum value of $i_\delta$Com is assigned and a variable $i_\delta$ComMin to which a minimum value of $i_\delta$Com is assigned are adopted, and a variable $i_\delta$Amp_now to which the variation range of the current $i_\delta$Com is assigned and a variable $i_\delta$Amp_old to which the variation range of the last $i_\delta$Com is assigned are adopted. Furthermore, in this procedure, the amount of phase adjustment $b_1$ used by the resonance filter 30 is treated as a variable, and $b_1$ can be sequentially updated. The amount of change in variable $b_1$ per change is $\alpha$. The initial values of the variables $i_\delta$ComMax, $i_\delta$ComMin, $i_\delta$Amp_now, and $i_\delta$Amp_old are set at zero. The initial value of the variable $b_1$ is set at a predetermined value.

Steps S11 to S20 are performed by the phase controller 32 every time the variable $i_\delta$Com is updated. First, in step S11, it is checked whether or not the rotor of the motor 1 has rotated one-turn from a given base point in time. Here, rotating "one-turn" is not rotating one-turn in electrical angle but rotating one-turn in mechanical angle. If the rotor of the motor 1 is found not to have rotated one-turn, the procedure proceeds to step S12, and it is checked whether or not the current variable $i_\delta$Com is greater than the current variable $i_\delta$ComMax. If $i_\delta$Com>$i_\delta$ComMax, the procedure proceeds to step S14. In step S14, the current variable $i_\delta$Com is assigned to the variable $i_\delta$ComMax, and the procedure proceeds to step S13. On the other hand, if $i_\delta$Com$\leq i_\delta$ComMax, the procedure directly proceeds to step S13.

In step S13, it is checked whether or not the current variable $i_\delta$Com is smaller than the current variable $i_\delta$ComMin. If $i_\delta$Com<$i_\delta$ComMin, the procedure proceeds to step S15. In step S15, the current variable $i_\delta$Com is assigned to the variable $i_\delta$ComMin, and the procedure goes back to step S11. On the other hand, if $i_\delta$Com$\geq i_\delta$ComMin, the procedure directly goes back to step S11.

In step S11, if the rotor of the motor 1 is found to have rotated one-turn from the base point in time, the procedure proceeds to step S16. At this point, the maximum and minimum values of the variable $i_\delta$Com obtained during one turn of the rotor are assigned to the variables $i_\delta$ComMax and $i_\delta$ComMin, respectively. In step S16, ($i_\delta$ComMax−$i_\delta$ComMin) is assigned to the variable $i_\delta$Amp_now. Then, in step S17, it is checked whether or not an inequality $i_\delta$Amp_now<$i_\delta$Amp_old holds. If this inequality is found to hold, the procedure directly proceeds to step S19. On the other hand, if this inequality is found not to hold, the procedure proceeds to step S18, and a value obtained by multiplying the current variable α by −1 is newly assigned to the variable α. Then, the procedure proceeds to step S19.

In step S19, a variable α is added to the current variable $b_1$, and a value thus obtained serves as a new variable $b_1$. The variable $b_1$ thus updated is transmitted to the resonance filter 30, and is used as the amount of phase adjustment $b_1$ when calculating the corrected δ-axis current value $i_{\delta C}$. Thereafter, in step S20, zero is assigned to the variable $i_\delta$ComMax, a maximum value MAX of the variable $i_\delta$ComMin is assigned to the variable $i_\delta$ComMin, and a value of the current variable $i_\delta$Amp_now is assigned to the variable $i_\delta$Amp_old. Then, the procedure goes back to step S12. It is assumed that the variable $i_\delta$ComMin takes on various values. The maximum value MAX here is the maximum of the various values that the variable $i_\delta$ComMin is assumed to take on. A time point at which the procedure goes back from step S20 to step S12 serves as a base point in time used as the reference for the next branching process in step S11.

By repeatedly performing a loop process consisting of steps S11 to S20, the variation range of $(i_\delta^* + i_{\delta C})$ is kept at or near a minimum value (local minimum, to be exact).

The procedure for minimizing the variation range of $(i_\delta^* + i_{\delta C})$ has been explained by using FIG. 10. Needless to say, however, the amplitude of the first-order component of $(i_\delta^* + i_{\delta C})$ may be minimized instead by using a similar method. In that case, it is necessary simply to extract the first-order component of $(i_\delta^* + i_{\delta C})$ from the output value of the adder 31 by using FFT (fast Fourier transform), and sequentially adjust the variable $b_1$ such that the amplitude of the first-order component is kept at or near a minimum value.

In the configuration described in JP-A-2006-180605, to achieve a reduction in power consumption requires the following processes. First, power consumption is sequentially measured while changing a limit value to a current component for correcting a torque variation component, and an optimum limit value is determined in advance based on the measurement results. Then, the optimum limit value thus obtained is stored as table data, and is referred to at the time of actual operation. Such an adjustment operation for deriving a parameter (limit value) is complicated. By contrast, the motor control device 3a makes it possible to automatically minimize power consumption without the need for performing such an adjustment operation, and at the same time reduce vibration and noise.

Changing $\omega_r$ in the transfer function of the resonance filter 30 naturally leads to a change in a frequency component at which reduction in vibration can be achieved by using the resonance filter 30. Sometimes load torque variations contain a plurality of frequency components; in general, $\omega_r$ is determined so as to adapt to a frequency component having the largest amplitude of those of the plurality of frequency components. Examples of compressors to which the motor drive system is applied are a single-stage compressor and a two-stage compressor. In a case where the motor drive system of the invention is applied to an n-stage compressor, $\omega_r$ is basically set so as to be n times as large as $\omega_e$ (or $\omega^*$) that is an operating frequency of the motor 1. That is, $\omega_r = n \times \omega_e$ (or $\omega_r = n \times \omega^*$) holds. Here, n is an integer such as 1 or 2, and an n-stage compressor is a compressor that performs n cycles of suction, compression, and discharge while the motor 1 rotates one-turn in mechanical angle.

However, even when compressors having the same number of compression stages are used, a frequency at which the load torque variations are maximized varies depending on the mechanical structure or the like of each compressor. Therefore, even in a case where the motor drive system of the invention is applied to a single-stage compressor, $\omega_r$ may be set such that $\omega_r = 2 \times \omega_e$ (or $\omega_r = 2 \times \omega^*$) or $\omega_r = 1.1 \times \omega_e$ (or $\omega_r = 1.1 \times \omega^*$) holds.

Example 2

Figure 11:
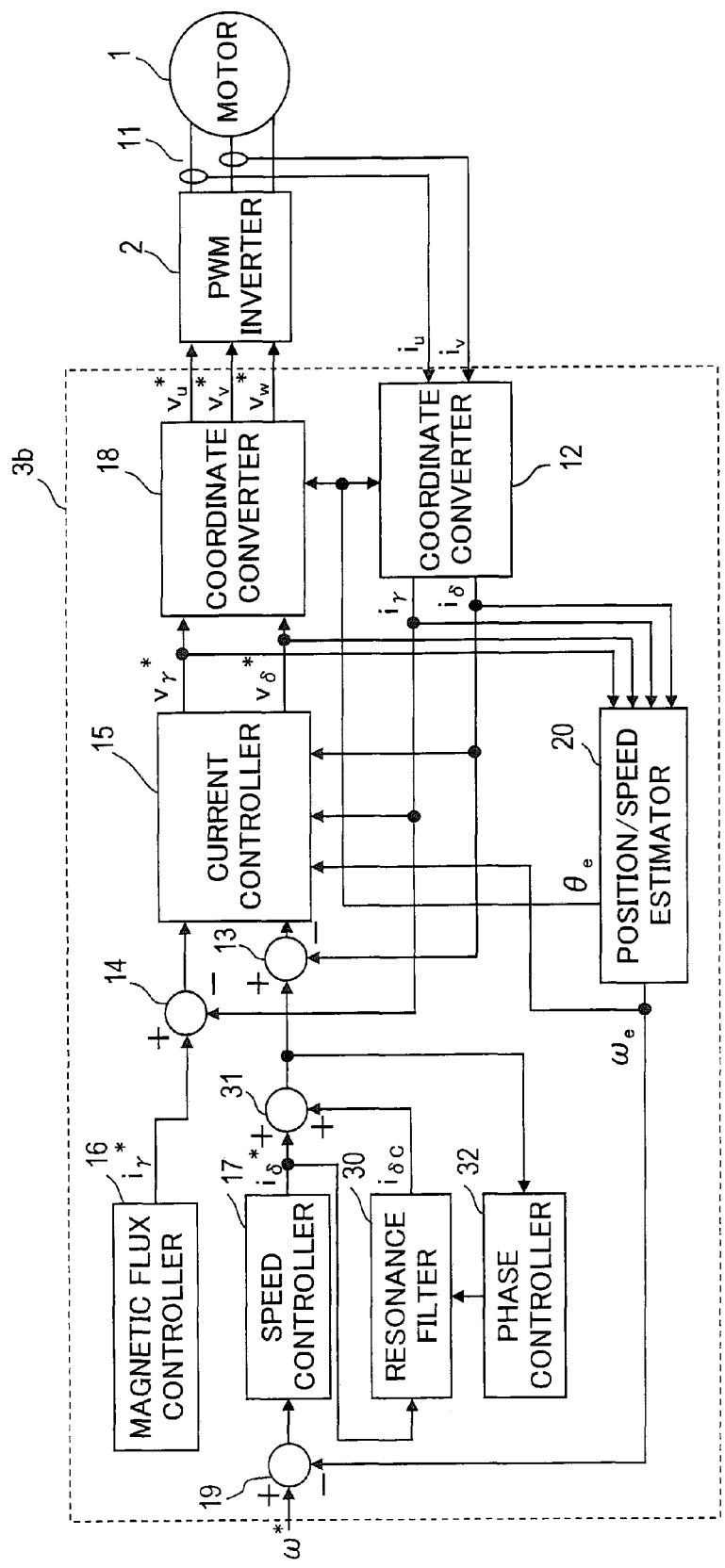
FIG. 11 is a detailed block diagram of a motor drive system according to Example 2 of the invention.

Next, Example 2 of the invention will be described. FIG. 11 is a detailed block diagram of a motor drive system according to Example 2. The motor drive system shown in FIG. 11 includes the motor 1 and the inverter 2, which are shown in FIG. 1, a motor control device 3b serving as the motor control device 3 shown in FIG. 1, and the phase-current sensor 11. The motor control device 3b includes different parts designated with reference numerals 12 to 20 and 30 to 32. The motor control device 3b can be considered to include the phase-current sensor 11. The different parts constituting the motor control device 3b can freely use all the values produced within the motor control device 3b.

In the motor control device 3a shown in FIG. 3, the resonance filter 30 receives a speed deviation $(\omega^* - \omega_e)$ as an input signal. However, in the motor control device 3b shown in FIG. 11, the resonance filter 30 receives, as an input signal, the specified δ-axis current value $i_\delta^*$ from the speed controller 17 instead of a speed deviation $(\omega^* - \omega_e)$. Thus, in this example, the resonance filter 30 extracts from $i_\delta^*$ a periodic variation component resulting from variations in load torque, and outputs the variation component thus extracted to the adder 31 as $i_{\delta C}$. The motor control devices 3a and 3b differ only in the input signal of the resonance filter 30; in other respects, they are identical with each other.

In a case where the speed deviation $(\omega^* - \omega_e)$ varies due to variations in load torque, the specified δ-axis current value $i_\delta^*$ also varies in a similar manner in synchronism with the speed deviation $(\omega^* - \omega_e)$. Therefore, with the configuration of the motor control device 3b, it is possible to achieve the same effects as those achieved in Example 1.

Example 3

Figure 12:
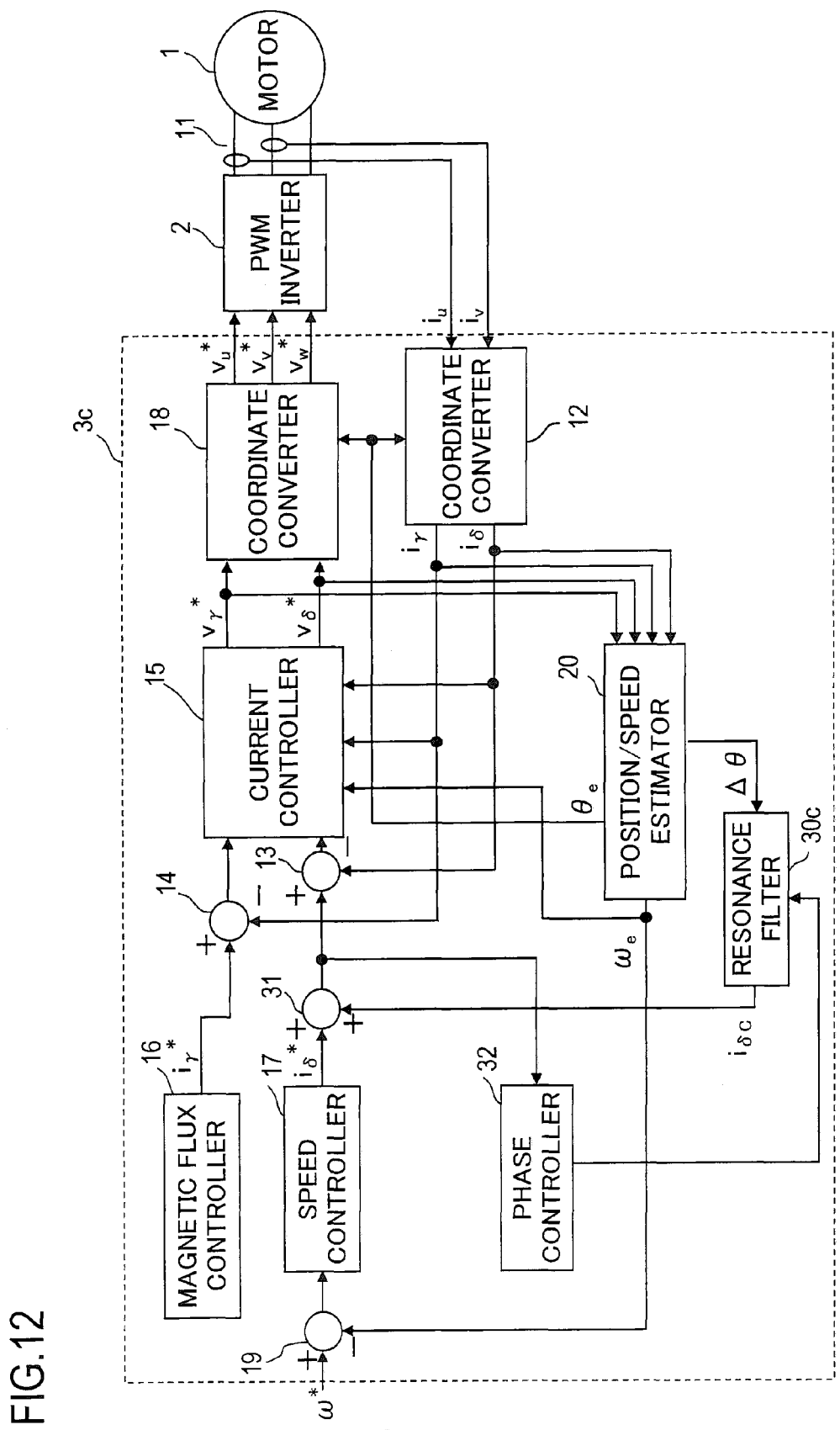
FIG. 12 is a detailed block diagram of a motor drive system according to Example 3 of the invention.

Next, Example 3 of the invention will be described. FIG. 12 is a detailed block diagram of a motor drive system according to Example 3. The motor drive system shown in FIG. 12 includes the motor 1 and the inverter 2, which are shown in FIG. 1, a motor control device 3c serving as the motor control device 3 shown in FIG. 1, and the phase-current sensor 11. The motor control device 3c includes different parts designated with reference numerals 12 to 20, 31, and 32, and a resonance filter 30c. The motor control device 3c can be considered to include the phase-current sensor 11. The different parts constituting the motor control device 3c can freely use all the values produced within the motor control device 3c.

In the motor control device 3a shown in FIG. 3, the resonance filter 30 calculates the corrected δ-axis current value $i_{\delta C}$ from the speed deviation $(\omega^* - \omega_e)$. However, in the motor control device 3c shown in FIG. 12, the resonance filter 30c calculates the corrected δ-axis current value $i_{\delta C}$ from the axis error Δθ. The motor control devices 3a and 3c differ only in the resonance filter; in other respects, they are identical with each other. In the following description, only the resonance filter 30c and input and output thereof are explained, and the explanations of such parts as are found in both the motor control devices 3a and 3c will be omitted.

The resonance filter 30c receives the axis error Δθ estimated by the position/speed estimator 20 as an input signal, and extracts from the axis error Δθ a periodic variation component resulting from variations in load torque. Then, the resonance filter 30c outputs the variation component thus extracted as a corrected δ-axis current value $i_{\delta C}$. The transfer function $H_B(s)$ of the resonance filter 30c is given by formula (5) below.

$$H_B(s) = (b_0 s + b_1)/(s^2 + 2\zeta \omega_r s + \omega_r^2) \quad (5)$$

Here, $b_o$ represents a gain coefficient, $b_1$ represents a phase adjusting value, ζ represents an attenuation coefficient, and $\omega_r$ represents a natural angular frequency, and these symbols are the same as those described in Example 1. In addition, s represents the Laplace operator. The resonance filter 30c amplifies (emphasizes) a frequency component of $\omega_r$ of the input signal to a degree commensurate with the gain coefficient $b_o$, and outputs it. Ideally, the resonance filter 30c extracts only a frequency component of $\omega_r$ of the input signal, and outputs it.

Since the axis error Δθ varies in synchronism with periodic variations in load torque, a periodic variation component of the axis error Δθ is emphasized in $i_{\delta C}$ obtained by multiplying the axis error Δθ by the transfer function $H_B(s)$. Here, the degree of emphasis, that is, the gain of the resonance filter 30c, is determined by the gain coefficient $b_o$. As is the case with the resonance filter 30 of Example 1, the resonance filter 30c gives a component of natural angular frequency $\omega_r$ contained in the input signal a phase lead in the range from 90 to 180 degrees, and the amount of phase lead is determined by $b_1$.

In the motor control device 3c, the adder 31 calculates the sum $(i_\delta^* + i_{\delta C})$ of the specified δ-axis current value $i_\delta^*$ from the speed controller 17 and the corrected δ-axis current value $i_{\delta C}$ from the resonance filter 30c, and outputs it to the subtracter 13. As in Example 1, the phase controller 32 adjusts the amount of phase adjustment $b_1$ used by the resonance filter 30c based on the output value $(i_\delta^* + i_{\delta C})$ of the adder 31, such that the variation range of $(i_\delta^* + i_{\delta C})$ or the amplitude of the first-order component of $(i_\delta^* + i_{\delta C})$ is minimized, and thereby adjusts the phase of the corrected δ-axis current value $i_{\delta C}$. As a result, it is possible to achieve the same effects as those achieved in Example 1.

In the motor control device 3c shown in FIG. 12, the axis error Δθ is inputted to the resonance filter 30c. However, a value of any other type may be inputted to the resonance filter 30c as long as it varies in synchronism with variations in the axis error Δθ (variations in the axis error Δθ at a natural angular frequency $\omega_r$), because the value varying in synchronism with variations in the axis error Δθ contains, as is the case with the axis error Δθ, a periodic variation component synchronized with periodic variations in load torque.

For example, a signal that is proportional (or substantially proportional) to the axis error Δθ may be inputted to the resonance filter 30c.

For example, a torque variation component ΔTm estimated by using the axis error Δθ may be inputted to the resonance filter 30c as an input signal. As described in the treatise titled "Reduction Control Method of Periodic Torque Disturbance for Compressor" by Yasuo Notohara et al.; presented at the 2004 Annual Conference of the Industry Applications Society of the Institute of Electrical Engineers of Japan; 1-57 (I-337-I-340); Sep. 14, 2004, since the torque variation component ΔTm is an approximate value calculated by, for example, formula (6) below, it can be considered to be proportional to the axis error Δθ. In formula (6), P represents the number of poles of the motor 1, and J represents inertia.

$$\Delta Tm = \frac{2J\omega_r^2}{P} \cdot \Delta \theta \quad (6)$$

The torque variation component ΔTm corresponds to the result of subtraction of a load torque from a torque produced by the motor 1, and the torque produced by the motor 1 cannot follow periodic variations in load torque, causing torque variations to occur (that is, preventing ΔTm from becoming zero). The torque variation component ΔTm causes variations in speed, resulting in variations in the axis error Δθ.

Example 4

Examples 1 to 3 deal with the motor drive systems in which vector control is performed such that the axis error Δθ between the d-axis and the γ-axis is made to converge to zero, that is, such that the γ-axis is made to follow the d-axis; however, Examples 1 to 3 may be modified to be Example 4 in which vector control is performed such that the γ-axis is made to follow an axis other than the d-axis. For example, by defining a dm-axis described in the treatise titled "Position Sensorless Vector Control for Permanent Magnet Synchronous Motors Based on Maximum Torque Control Frame" by Hida et al.; published by the Industry Applications Society of the Institute of Electrical Engineers of Japan; included in the Collection of the Lecture Treatises Presented at the 2006 Annual Conference of the Industry Applications Society of the Institute of Electrical Engineers of Japan; pp. 385-388 (1-385-I-388); August 2006, vector control may be performed such that the γ-axis is made to follow the dm-axis.

The dm-axis is an axis that lags behind a qm-axis by an electrical angle of 90 degrees. The qm-axis is the rotation axis whose direction coincides with that of the current vector to be fed to the motor 1 when maximum torque control is achieved. The current vector to be fed to the motor 1 is the current to be fed to the motor 1, the current being expressed in vector form. Alternatively, the qm-axis may be the rotation axis having a phase leading the rotation axis whose direction coincides with that of the current vector to be fed to the motor 1 when maximum torque control is achieved.

In a case where vector control is performed such that the γ-axis is made to follow the dm-axis, it is necessary simply to perform the following processing, for example. The position/speed estimator 20 shown in FIG. 3 and other drawings estimates the axis error $\Delta \theta_m$ between the dm-axis and the γ-axis by using all or part of $i_\gamma$, $i_\delta$, $v_\gamma^*$ and $v_\delta^*$, and estimates the rotor position $\theta_e$ and the rotation speed $\omega_e$ such that the axis error $\Delta \theta_m$ is made to converge to zero by using proportional-plus-integral control.

Example 5

Examples 1 to 4 deal with the motor drive systems in which position sensorless vector control is performed that uses no position sensor for detecting the rotor position. However, the techniques described in Examples 1 to 4 are useful in a case where the position sensor is provided. As Example 5 of the invention, a description will be given below of a motor drive system provided with the position sensor. Any feature of Examples 1 to 4 can be applied, unless inconsistent, to Example 5.

For the sake of concreteness, with reference to FIG. 3, a configuration (unillustrated) of a motor drive system that differs from the motor drive system shown in FIG. 3 according to Example 1 in that a position sensor is further added will be described. The motor drive system according to Example 5 differs from the motor drive system shown in FIG. 3 in that $\theta_e$ and $\omega_e$ are detected based on the output signal of the position sensor, and that this eliminates the need for the estimator 20. In other respects, this motor drive system is the same as that shown in FIG. 3.

The position sensor is realized with, for example, Hall devices or resolvers, and outputs a signal for specifying the magnetic pole position of the permanent magnet 1a of the rotor of the motor 1 (that is, a signal for specifying the rotor position θ). The phase of the d-axis, relative to the U-phase armature winding fixed axis, is detected based on the output signal of the position sensor. The phase (rotor position) thus detected is treated as $\theta_e$. This rotor position $\theta_e$ is, ideally, identical to θ shown in FIG. 2, and is fed to the coordinate converters 12 and 18. In addition, the rotor position $\theta_e$ is differentiated by a speed calculating differentiator (unillustrated) to obtain $\omega_e$, and $\omega_e$ thus obtained is fed to the subtracter 19 and the current controller 15.

It is needless to say that the same effects as those achieved in Example 1 can be achieved by configuring the motor drive system as in Example 5.

Example 6

Figure 13:
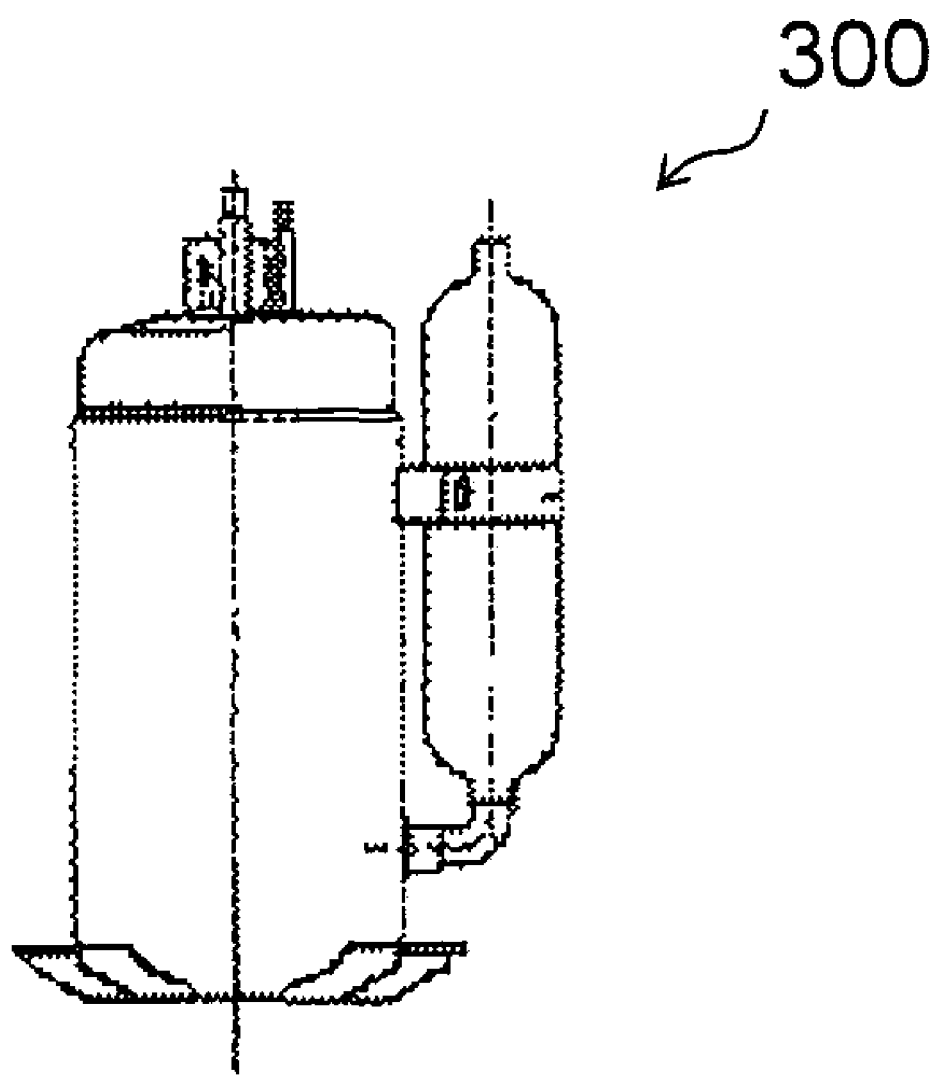
FIG. 13 is an external view of a compressor driven by the motor drive system of the invention.

As an example of an apparatus to which the motor drive systems described in Examples 1 to 5 are applied, a compressor 300 is shown in FIG. 13. FIG. 13 is an external view of the compressor 300. Any one of the motor drive systems according to Examples 1 to 5 is provided in the compressor 300. The compressor 300 compresses refrigerant gas (unillustrated) by using a torque of the motor 1 (a torque produced by the motor 1) as its drive source.

For example, the compressor 300 is a scroll compressor. In this case, a pair of scrolls (unillustrated) of identical shape are provided inside the compressor 300. One of the scrolls is fixed, and the other is made to orbit eccentrically by a torque of the motor 1. This changes the volume of the compression space, whereby gases (such as refrigerant gas) inside the compression space are compressed. Before and after the compression of the gas, sucking and discharge of the gas is performed. In this case, a load that is directly driven by the torque of the motor 1 is the scroll. However, the scroll compressor itself can be considered to be a load of the motor 1.

Needless to say, the compressor 300 may be a compressor other than a scroll compressor, such as a reciprocating compressor or a rotary compressor. In a case where the compressor 300 is a reciprocating compressor, the compressor 300 has a piston and a cylinder forming a compression space, and the piston is made to reciprocate in the cylinder by the torque of the motor 1. This changes the volume of the cylinder, whereby gases (such as refrigerant gas) inside the cylinder are compressed. In this case, a load that is directly driven by the torque of the motor 1 is the piston. However, the reciprocating compressor itself can be considered to be a load of the motor 1.

Example 7

Figure 14:
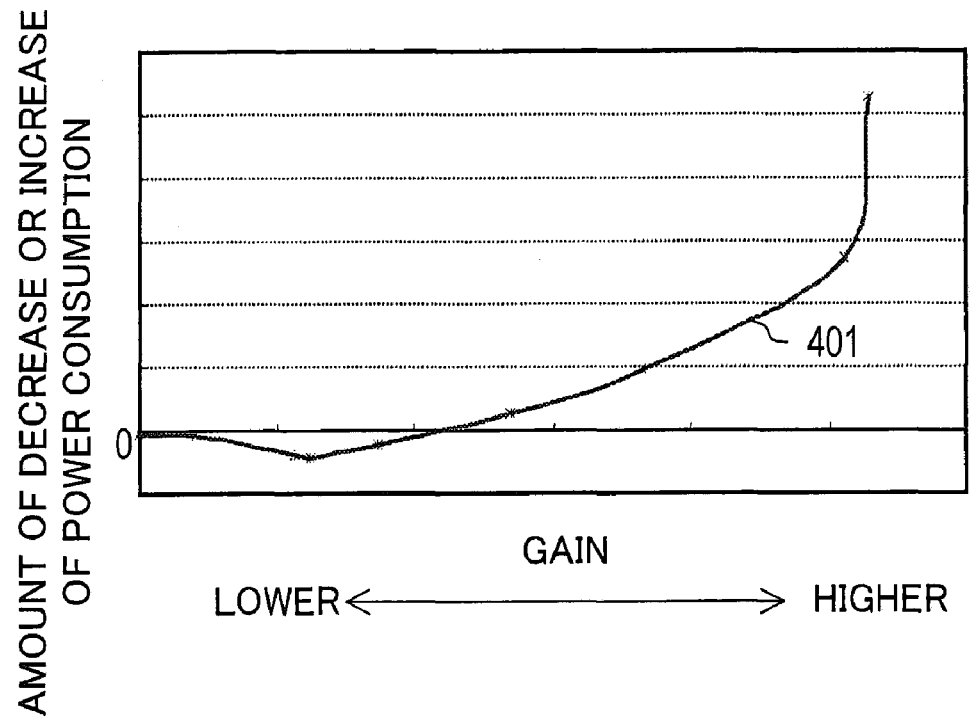
FIG. 14 is the experimental results according to Example 7 of the invention, indicating the gain dependence of the amount of decrease or increase of power consumption in the motor drive system.
Figure 15:
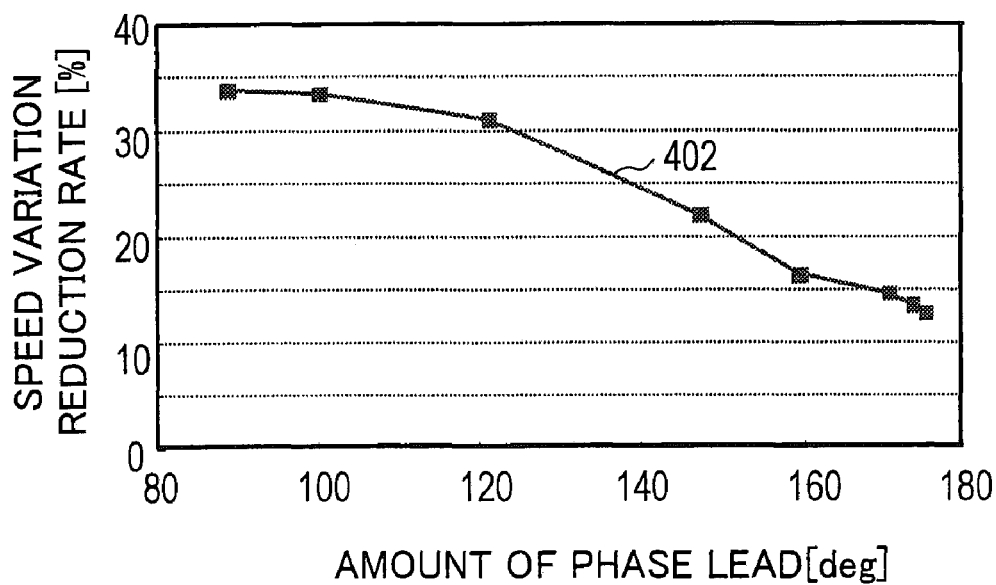
FIG. 15 is the experimental results according to Example 7 of the invention, indicating the dependence of the speed variation reduction rate on the amount of phase lead in the motor drive system.

The behavior of power consumption described above will be discussed while explaining the experimental results, derivation of theoretical formulae, and the simulation results. For the sake of convenience, the following explanation is provided as an explanation of Example 7.
Experimental Results In addition to FIGS. 14 and 15, by referring to the above-described FIG. 7, the explanation is given. FIGS. 14 and 15 each show the experimental results conducted for the motor drive system shown in FIG. 3.

In FIG. 14, a curve 401 represents the experimental results indicating the gain dependence of the amount of decrease or increase of power consumption relative to power consumption observed when the gain is zero (that is, $b_o=0$). It is to be noted that the experiments to obtain the curve 401 were performed with the conditions (such as $b_1$ and ω*) other than gain fixed at constant values. As the gain increases from zero, power consumption decreases, and reaches a minimum value. Then, as the gain further increases, power consumption gradually increases from the minimum value.

On the other hand, as explained above by referring to FIG. 7, as the amount of phase lead given by the resonance filter 30 increases from 90 to 180 degrees, power consumption basically decreases.

In addition, when no resonance filter 30 is provided, the motor speed ($\omega_e$) varies greatly due to load torque variations. By providing the resonance filter 30, it is possible to reduce the amount of variation in motor speed. Here, the rate of reduction of variation in motor speed relative to the amount of variation in motor speed observed when no resonance filter 30 is provided is referred to as the speed variation reduction rate. Suppose that the amount of variation in motor speed observed when no resonance filter 30 is provided is 100. Then, the amount of variation in motor speed when the speed variation reduction rate is 30% is 70. Since variation in motor speed causes vibration of the compressor or the like, the higher the speed variation reduction rate, the greater vibration-reduction effect.

A polygonal line 402 shown in FIG. 15 represents the experimental results indicating the dependence of the speed variation reduction rate on the amount of phase lead in the motor control system shown in FIG. 3. It is to be noted that the experiments to obtain the polygonal line 402 were performed with the conditions (such as $b_0$ and ω*) other than the amount of phase lead fixed at constant values. These experimental results revealed that, when the amount of phase lead is 90 degrees, the speed variation reduction rate reaches a maximum, and, as the amount of phase lead increases from 90 to 180 degrees, the speed variation reduction rate decreases.
Derivation of Theoretical Formulae on Power The relationship between power consumption and the gain and amount of phase lead of the resonance filter 30 will be discussed through derivation of theoretical formulae.

Let power consumption of the motor drive system be $P_W$. Then, the power consumption $P_W$ is given by formula (7a) below. Assuming that $i_d$ is ignored because, in general, $i_d=0$ or $i_q \gg i_d \neq 0$, then the power consumption $P_W$ is given by formula (7b). Here, $v_d$ and $v_q$ represent the d-axis component and the q-axis component, respectively, of the motor voltage $V_a$, and $i_d$ and $i_q$ represent the d-axis component and the q-axis component, respectively, of the motor current $I_a$.

$$P_W = i_d v_d + i_q v_q \tag{7a}$$

$$P_W = i_q v_q \tag{7b}$$

In addition, the voltage equation of the permanent-magnet synchronous motor is given by formula (8a). Rearranging formula (8a) gives formula (8b). Furthermore, assuming that $i_d=0$ and the system is in a steady state, then the derivative term can be ignored. As a result, formula (8c) holds. Here, $\Phi_a$ represents the armature flux linkage ascribable to the permanent magnet of the motor 1, and p represents a differential operator.

$$\begin{bmatrix} v_d \\ v_q \end{bmatrix} = \begin{bmatrix} R_a + pL_d & -\omega L_q \\ \omega L_d & R_a + pL_q \end{bmatrix} \begin{bmatrix} i_d \\ i_q \end{bmatrix} + \begin{bmatrix} 0 \\ \omega \Phi_a \end{bmatrix} \quad (8a)$$

$$v_q = \omega L_d i_d + (R_a + pL_q)i_q + \omega \Phi_a \quad (8b)$$

$$v_q = R_a i_q + \omega \Phi_a \quad (8c)$$

Substituting formula (8c) in formula (7b) gives formula (9).

$$P_W = R_a i_q^2 + \omega \Phi_a i_q \quad (9)$$

The first term in the right side of formula (9) represents a power loss due to the motor resistance, and the second term in the right side thereof represents power involved in the occurrence of torque. Due to the presence of the first term that is proportional to $i_q^2$, an increase in the harmonic components contained in $i_q$ leads to an increase in loss and hence in power consumption. In a case where the γ-δ axes is made to follow the d-q axes as in Example 1, since $i_q$ follows ($i_δ$*+$i_{δC}$), by reducing the harmonic components (in particular, the first-order component which is the most dominant of them all) of ($i_δ$*+$i_{δC}$), it is possible to reduce power consumption.

Discussion on Simulation

A simulation is performed in order to study the relationship between power consumption and the gain and amount of phase lead of the resonance filter 30 by modeling the motor control system shown in FIG. 3 or 11.

Now, let the waveform of $i_δ$* be fi given by formula (10a), and the waveform of $i_{δC}$ be fr given by formula (10b). Here, $A_1$ and $A_2$ represent an amplitude value of the waveform fi and an amplitude value of fr, respectively, CONST represents a constant, and Q represents the phase of the waveform fr, satisfying $π/2 \leq Q \leq π$. In addition, t represents time.

$$fi = A_1 \sin(\omega t) + CONST \quad (10a)$$

$$fr = A_2 \sin(\omega t + Q) \quad (10b)$$

Figure 16:
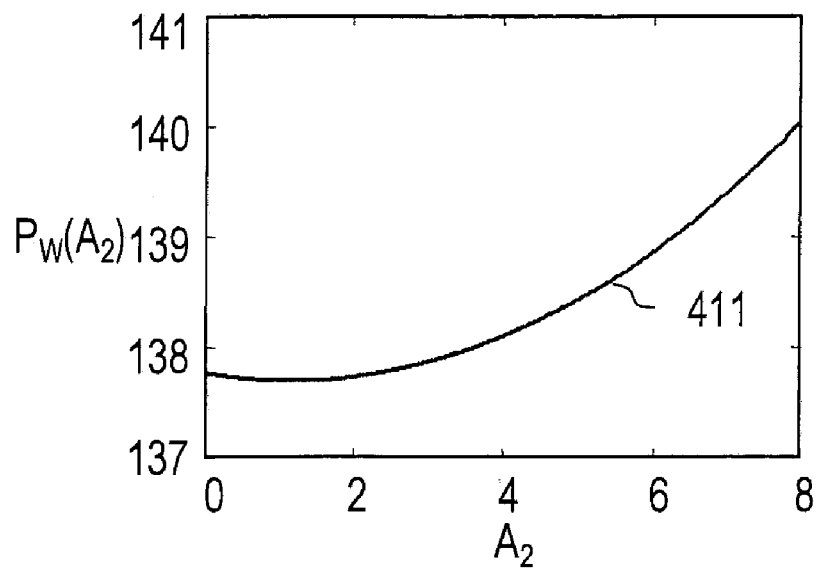
FIG. 16 is the simulation results according to Example 7 of the invention, indicating the relationship between the amplitude of the output signal of the resonance filter and power consumption of the motor drive system.

$P_W$ given by formula (9) and fr given by formula (10b) are considered as functions of the amplitude $A_2$, and are expressed as $P_W(A_2)$ and $fr(A_2)$, respectively. By performing a simulation according to formula (11), a function value of $P_W(A_2)$ for different amplitudes $A_2$ was obtained. A curve 411 shown in FIG. 16 represents the relationship between $A_2$ and $P_W(A_2)$ indicating the simulation results. In this simulation, $R_a$=0.1Ω, ω=2×π×30 rad/s, CONST=6.5 A, $Φ_a$=0.107 Wb, Q=2×π×100/360 rad/s, and $A_1$=7 A, and $A_2$ was changed in the range of 0 A $\leq A_2 \leq$ 8 A.

$$P_W(A_2) = R_a(fi+fr(A_2))^2 + \omega\Phi_a(fi+fr(A_2)) \quad (11)$$

Figure 17:
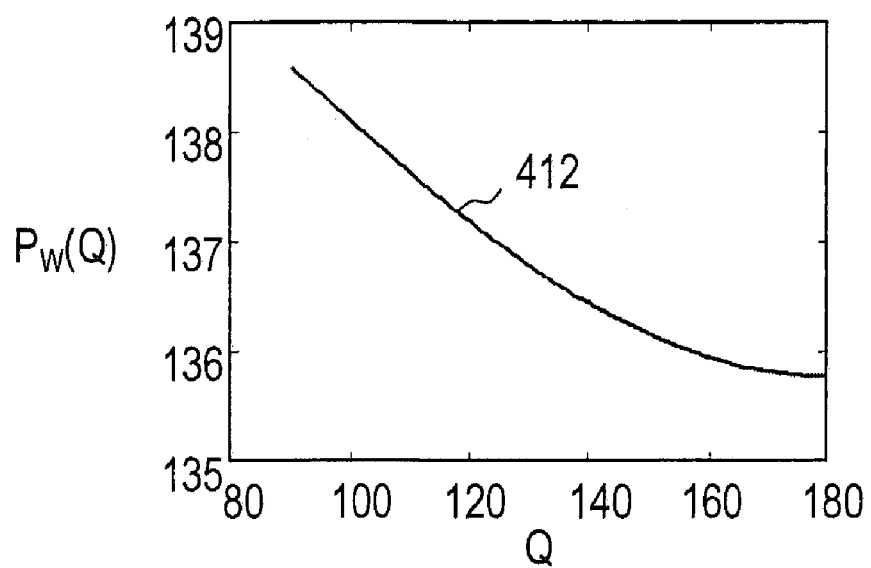
FIG. 17 is the simulation results according to Example 7 of the invention, indicating the relationship between the phase of the output signal of the resonance filter and power consumption of the motor drive system.

$P_W$ given by formula (9) and fr given by formula (10b) are considered as functions of the phase Q, and are expressed as $P_W(Q)$ and fr(Q), respectively. By performing a simulation according to formula (12), a function value of $P_W(Q)$ for different phases Q was obtained. A curve 412 shown in FIG. 17 represents the relationship between Q and $P_W(Q)$ indicating the simulation results. In this simulation, $R_a$=0.1Ω, ω=2×π×30 rad/s, CONST=6.5 A, $Φ_a$=0.107 Wb, $A_1$=7 A, and $A_2$=4 A, and Q was changed in the range of 2×π×90/360 rad $\leq Q \leq$ 2×π×180/360 rad.

$$P_W(Q) = R_a(fi+fr(Q))^2 + \omega\Phi_a(fi+fr(Q)) \quad (12)$$

The experimental results about power consumption corresponding to FIGS. 14 and 7 and the simulation results about power consumption corresponding to FIGS. 16 and 17 exhibit the same tendency. Therefore, the model and power consumption reduction principles assumed in the simulation are considered to be correct. The reason is considered to be as follows. As will be understood from above-described formula (9) on power, a harmonic component of ($i_δ$*+$i_{δC}$) to be followed by $i_q$ changes with a change in the amplitude $A_2$ or phase Q, resulting in a change in power consumption.

Therefore, a simulation to check how the harmonic component of ($i_δ$*+$i_{δC}$) changes is additionally performed.

Now, fr given by formula (10b) is considered as a function of the amplitude $A_2$, and is expressed as fr($A_2$). By performing a simulation according to formula (13), a function value of the combined waveform F($A_2$) for different amplitudes $A_2$ was obtained. In this simulation, Q=2×π×100/360 rad, and $A_2$ was changed in the range of 0 A $\leq A_2 \leq$ 8 A.

$$F(A_2) = fi + fr(A_2) \quad (13)$$

Figure 18:
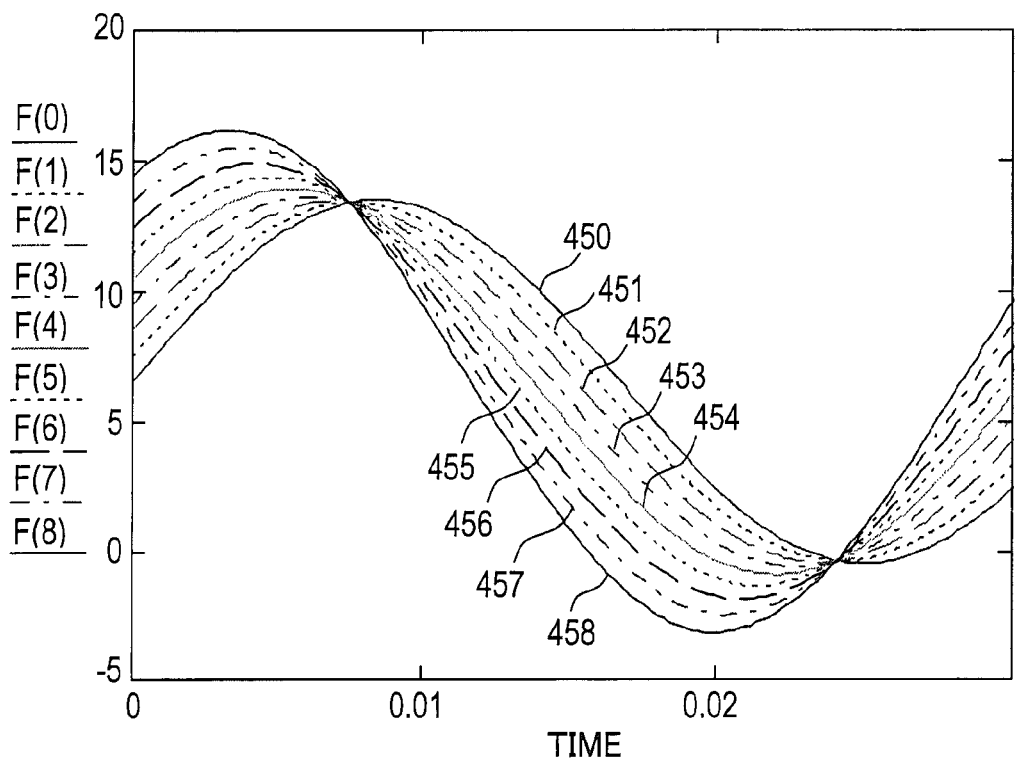
FIG. 18 is the simulation results according to Example 7 of the invention, indicating the gain dependence of the waveform of ($i_δ^*+i_{δC}$)

FIG. 18 is the simulation results corresponding to formula (13). In FIG. 18, the horizontal axis represents time, and the vertical axis represents a value of the combined waveform F($A_2$) at each time. In FIG. 18, curves 450, 451, 452, 453, 454, 455, 456, 457, and 458 represent the combined waveform F($A_2$) obtained when $A_2$=0, 1, 2, 3, 4, 5, 6, 7, and 8 A, respectively. As the amplitude $A_2$ is increased by increasing the gain, the amplitude of the combined waveform F($A_2$) is temporarily reduced. As a result, it is expected that power consumption is also reduced. As the gain is further increased, the amplitude of the combined waveform F($A_2$) gradually begins to increase. As a result, it is expected that power consumption also increases.

In addition, fr given by formula (10b) is considered as a function of the phase Q, and is expressed as fr(Q). By performing a simulation according to formula (14), a function value of the combined waveform F(Q) for different phases Q was obtained. In this simulation, $A_2$=4 A, and Q was changed in the range of 2×π×90/360 rad $\leq Q \leq$ 2×π×180/360 rad.

$$F(Q) = fi + fr(Q) \quad (14)$$

Figure 19:
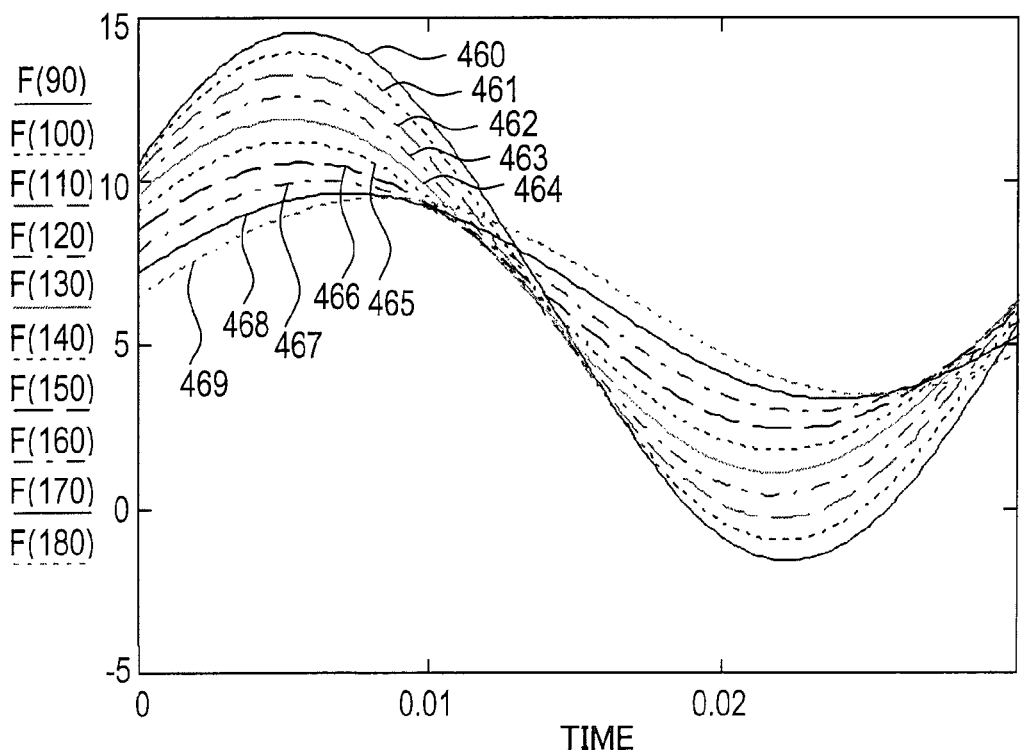
FIG. 19 is the experimental results according to Example 7 of the invention, indicating the dependence of the waveform of ($i_δ^*+i_{δC}$) on the amount of phase lead.

FIG. 19 is the simulation results corresponding to formula (14). In FIG. 19, the horizontal axis represents time, and the vertical axis represents a value of the combined waveform F(Q) at each time. In FIG. 19, curves 460, 461, 462, 463, 464, 465, 466, 467, 468, and 469 represent the combined waveform F(Q) obtained when Q=90, 100, 110, 120, 130, 140, 150, 160, 170, and 180 degrees, respectively. As the phase Q leads, the amplitude of the combined waveform F($A_2$) is reduced. As a result, it is expected that power consumption also decreases.

The simulation results corresponding to FIGS. 18 and 19 also suggest that the model and power consumption reduction principles assumed in the simulation are correct.

Figure 20:
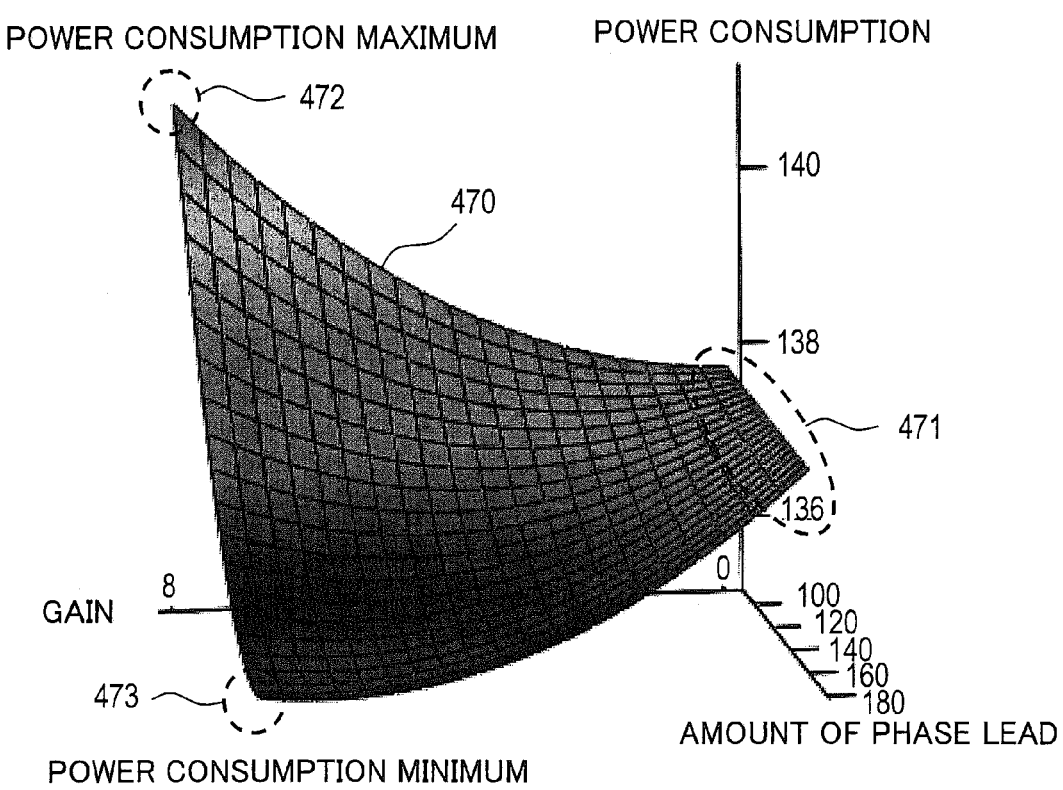
FIG. 20 is a diagram according to Example 7 of the invention, indicating the phase and gain dependence of power consumption of the motor drive system.

Furthermore, the dependence of power consumption on the gain and amount of phase lead when both the gain and the amount of phase lead are considered as a variable was obtained by a simulation. A three-dimensional surface 470 shown in FIG. 20 represents the results of this simulation. In the three-dimensional surface 470, a region 471 corresponds to a state in which the resonance filter is hardly functioning. If the amount of phase lead is set to 90 degrees while the gain of the resonance filter is sufficiently high, power consumption is maximized (corresponding to a region 472); if the amount of phase lead is set to 180 degrees while the gain of the resonance filter is sufficiently high, power consumption is minimized (corresponding to a region 473).

It is to be noted that, under specific simulation conditions in which the motor drive system is modeled in a simplified form, when the amount of phase lead is 180 degrees, the variation range of ($i_δ$*+$i_{δC}$) is minimized, whereby power consumption is minimized. However, in real-world appliances, the amount of phase lead to minimize the variation range of $(i_\delta^* + i_{\delta C})$ or the amplitude of the first-order component of $(i_\delta^* + i_{\delta C})$ is not always 180 degrees, and it can vary depending on various factors including the motor speed and the mechanical structure of an appliance into which the motor drive system is incorporated. According to the motor drive systems of Examples 1 to 5, however, the amount of phase lead is automatically adjusted so as to reduce power consumption with consideration given to these various factors.

Example 8

As will be understood from FIGS. 7 and 15, although an increase in the amount of phase lead in the resonance filter basically contributes to reduction in power consumption, it is undesirable from the viewpoint of reducing vibration of an appliance (such as a compressor) into which the motor drive system is incorporated. That is, there are tradeoffs between reduction in power consumption and reduction in vibration in determining the amount of phase lead. On the other hand, different users have different demands on power consumption and reduction in vibration. Some users give higher priority to reduction in power consumption; others give higher priority to reduction in vibration.

With consideration given to such a case, the following application is beneficial. This application is explained as Example 8. With reference to FIG. 3, a case in which this application is applied to the motor drive system of Example 1 will be discussed.

First, a mode setting portion (unillustrated) is provided in the motor control device 3a, the motor drive system, or an appliance into which the motor drive system is incorporated. The user is allowed to select, from among a plurality of operation modes, an operation mode of the appliance into which the motor drive system is incorporated by performing operation for the mode setting portion. The plurality of operation modes include a power consumption priority mode and a vibration suppression priority mode. Information for identifying the selected operation mode is called mode selection information. The mode selection information is transmitted to the motor control device 3a.

If the power consumption priority mode is selected, the mode selection information indicating that mode is transmitted to the motor control device 3a. In this case, the phase controller 32 minimizes the variation range of $(i_\delta^* + i_{\delta C})$ or the amplitude of the first-order component of $(i_\delta^* + i_{\delta C})$ by adjusting the amount of phase lead, which has been described in Example 1, thereby achieves minimization of power consumption.

If the vibration suppression priority mode is selected, the mode selection information indicating that mode is transmitted to the motor control device 3a. In this case, for example, the phase controller 32 adjusts the amount of phase lead of the resonance filter 30 in the direction in which the variation range of $(i_\delta^* + i_{\delta C})$ or the amplitude of the first-order component of $(i_\delta^* + i_{\delta C})$ increases. In extreme cases, for example, the amount of phase lead is adjusted by using a hill-climbing algorithm or the like, such that the variation range of $(i_\delta^* + i_{\delta C})$ or the amplitude of the first-order component of $(i_\delta^* + i_{\delta C})$ is maximized within the phase lead amount adjustable range. Adjustment for the amount of phase lead is performed, in actuality, by adjusting the amount of phase adjustment $b_1$. Since the direction in which the amount of phase lead is changed for reducing power consumption is basically opposite to the direction in which the amount of phase lead is changed for reducing vibration, the amount of phase lead of the resonance filter 30 is adjusted in the direction in which the variation range of $(i_\delta^* + i_{\delta C})$ or the amplitude of the first-order component of $(i_\delta^* + i_{\delta C})$ increases. This makes it possible to obtain a greater vibration-reduction effect.

Alternatively, the phase controller 32 may control the resonance filter 30 as follows. The amount of phase adjustment $b_1$ ($=b_{1A}$) by which power consumption is minimized is previously obtained by experiment or the like, and is set in the motor control device 3a. If the power consumption priority mode is selected, control is performed such that the previously set amount of phase adjustment $b_1$ ($=b_{1A}$) is used by the resonance filter 30. Similarly, the phase controller 32 may control the resonance filter 30 as follows. The amount of phase adjustment $b_1$ ($=b_{1B} \neq b_{1A}$) by which vibration of the appliance into which the motor drive system is incorporated is minimized is previously obtained by experiment or the like, and is set in the motor control device 3a. If the vibration suppression priority mode is selected, control is performed such that the previously set amount of phase adjustment $b_1$ ($=b_{1B}$) is used by the resonance filter 30. As described above, in a case where the amount of phase adjustment $b_1$ ($=b_{1A}$) by which power consumption is minimized and the amount of phase adjustment $b_1$ ($=b_{1B}$) by which vibration is minimized are previously obtained, the phase controller 32 is not required to use $(i_\delta^* + i_{\delta C})$ in controlling the resonance filter 30. That is, in this case, the phase controller 32 controls the phase of $i_{\delta C}$ by controlling the resonance filter 30 based not on $(i_\delta^* + i_{\delta C})$ but on the mode selection information.

Although the descriptions heretofore deal with the power consumption priority mode and the vibration suppression priority mode included in the plurality of operation modes, the plurality of operation modes may include other operation modes. For example, a mode intermediate between the power consumption priority mode and the vibration suppression priority mode may be provided. When this intermediate mode is selected, power consumption is at a level between power consumption achieved when the power consumption priority mode is selected and power consumption achieved when the vibration suppression priority mode is selected, and vibration is at a level between the level of vibration achieved when the power consumption priority mode is selected and the level of vibration achieved when the vibration suppression priority mode is selected.

For the sake of concreteness, the descriptions heretofore deal with a case in which an application of Example 8 is applied to the motor drive system of Example 1 shown in FIG. 3. However, Example 8 can be applied to the motor drive systems of Examples 1 to 5. In a case where Example 8 is applied to Example 2, it is simply necessary to replace reference character 3a appearing in the above description of Example 8 with reference character 3b; in a case where Example 8 is applied to Example 3, it is simply necessary to replace reference characters 3a and 30 appearing in the above description of Example 8 with reference characters 3c and 30c.

MODIFICATIONS AND VARIATIONS

What has been explained about an example can be applied, unless inconsistent, to any other example. At the time of application, it can be construed, if necessary, that the difference among reference numerals (such as 3a, 3b, and 3c) attached to the parts having the same name may be ignored. Hereinafter, notes 1 to 5 will be described as modified examples of the embodiment described above or annotations made thereon. Any feature of notes 1 to 5 described below can be applied, unless inconsistent, to any note other than that in connection with which the feature is specifically described.

Note 1

The embodiment described above deals with a method of adjusting the phase of $i_{\delta C}$. Concurrent with this phase adjustment, the gain of the resonance filter (30 or 30c) may be adjusted.

Note 2

Any of the different specified values (such as $i_\gamma^*$, $i_\delta^*$, $v_\gamma^*$, and $v_\delta^*$) and state quantities (such as $i_\gamma$ and $i_\delta$) mentioned above, that is, any value that needs to be derived as necessary may be derived in any manner. That is, such values may be derived, for example, through calculation performed within the motor control device (3a, 3b, or 3c), or may be derived from a previously set table data.

Note 3

The embodiment described above deals with a case in which the U-phase current $i_u$ and the V-phase current $i_v$ are directly detected by using the phase-current sensor 11; however, it is also possible to detect them based on the direct current on the power supply side of the inverter 2.

Note 4

Part or all of the functions of the motor control device (3a, 3b, or 3c) is realized, for example, with software (program) incorporated in a general-purpose microcomputer or the like. When the motor control device is realized with software, the block diagrams showing the configurations of different parts of the motor control device serve as functional block diagrams. Needless to say, the motor control device may be realized with hardware alone, instead of software (program), or may be realized with a combination of software and hardware.

Note 5

For example, it can be considered that, in the embodiment described above, the position/speed estimator 20 shown in FIG. 3 and other drawings serves as a motor speed deriving portion that derives the motor speed $\omega_e$ by estimation. However, in Example 5, the aforementioned speed calculating differentiator (unillustrated) serves as the motor speed deriving portion, and this speed calculating differentiator detects the motor speed $\omega_e$ in collaboration with the position sensor (the motor speed deriving portion may be considered to include the position sensor).

Since the specified δ-axis current value $i_\delta^*$ is a specified value for a current component related to the torque of the motor 1, it can be called a specified torque current value. In response to this, the corrected δ-axis current value $i_{\delta C}$ can be called a corrected torque current value. In addition, the phase controller 32 shown in FIG. 3 and other drawings serves as an adjusting portion that adjusts the phase of the corrected torque current value by controlling the resonance filter (30 or 30c), and the adder 31 shown in FIG. 3 and other drawings serves as a torque current corrector.

What is claimed is:

1. A motor control device performing vector control for a motor that drives a load whose load torque varies periodically, the motor control device comprising:
   a motor speed deriving portion estimating or detecting a motor speed;
   a speed controller producing a specified torque current value such that the motor speed is made to follow a specified motor speed value fed from outside;
   a resonance filter producing a corrected torque current value by receiving a control value that varies with variations in the load torque and emphasizing a periodic variation component of the control value;
   a torque current corrector producing a specified superimposed torque current value by superimposing the corrected torque current value on the specified torque current value; and
   an adjusting portion adjusting, based on the specified superimposed torque current value, a phase of the corrected torque current value by controlling the resonance filter, the adjusting portion adjusting the phase of the corrected torque current value such that a variation range of the specified superimposed torque current value is reduced,
   wherein the vector control is performed according to the specified superimposed torque current value.

2. The motor control device of claim 1,
   wherein the control value is a difference between the motor speed and the specified motor speed value, or the control value is the specified torque current value.

3. The motor control device of claim 1,
   wherein, let an axis parallel to a magnetic flux produced by a permanent magnet provided on a rotor of the motor be called a d-axis, and
   let an axis estimated for control purposes, the axis corresponding to the d-axis, be called a γ-axis,
   then, the motor control device comprises an estimator estimating, based on a motor current to be fed to the motor, an axis error between the d-axis and the γ-axis, and the motor speed,
   wherein the control value is the axis error, or a value varying in synchronism with variations in the axis error.

4. A motor control device performing vector control for a motor that drives a load whose load torque varies periodically, the motor control device comprising:
   a motor speed deriving portion estimating or detecting a motor speed;
   a speed controller producing a specified torque current value such that the motor speed is made to follow a specified motor speed value fed from outside;
   a resonance filter producing a corrected torque current value by receiving a control value that varies with variations in the load torque and emphasizing a periodic variation component of the control value;
   a torque current corrector producing a specified superimposed torque current value by superimposing the corrected torque current value on the specified torque current value; and
   an adjusting portion adjusting a phase of the corrected torque current value by controlling the resonance filter according to mode selection information indicating which control mode of a plurality of control modes is used to control the motor,
   wherein the vector control is performed according to the specified superimposed torque current value,
   wherein the plurality of control modes include a power consumption priority mode and a vibration suppression priority mode, and
   wherein the adjusting portion, when the power consumption priority mode is selected, adjusts the phase of the corrected torque current value such that a variation range of the specified superimposed torque current value is reduced and, when the vibration suppression priority mode is selected, adjusts the phase of the corrected torque current value such that the variation range of the specified superimposed torque current value is increased.

5. A motor drive system, comprising:
   a motor;
   an inverter driving the motor; and the motor control device of claim 1 performing vector control for the motor via the inverter.

6. A compressor using, as a drive source thereof, a torque of the motor provided in the motor drive system of claim 5.

7. A motor drive system, comprising:
a motor;
an inverter driving the motor; and
the motor control device of claim 4 performing vector control for the motor via the inverter.

8. A compressor using, as a drive source thereof, a torque of the motor provided in the motor drive system of claim 7.

9. A motor control device performing vector control for a motor that drives a load whose load torque varies periodically, the motor control device comprising:
a motor speed deriving portion estimating or detecting a motor speed;
a speed controller producing a specified torque current value such that the motor speed is made to follow a specified motor speed value fed from outside;
a resonance filter producing a corrected torque current value by receiving a control value that varies with variations in the load torque and emphasizing a periodic variation component of the control value;
a torque current corrector producing a specified superimposed torque current value by superimposing the corrected torque current value on the specified torque current value; and
an adjusting portion adjusting, based on the specified superimposed torque current value, a phase of the corrected torque current value by controlling the resonance filter, the adjusting portion extracting, from the specified superimposed torque current value, a frequency component of variations in the load torque, and adjusting the phase of the corrected torque current value such that an amplitude of the frequency component is reduced,
wherein the vector control is performed according to the specified superimposed torque current value.

10. The motor control device of claim 9,
wherein the control value is a difference between the motor speed and the specified motor speed value, or the control value is the specified torque current value.

11. The motor control device of claim 9,
wherein, let an axis parallel to a magnetic flux produced by a permanent magnet provided on a rotor of the motor be called a d-axis, and
let an axis estimated for control purposes, the axis corresponding to the d-axis, be called a γ-axis, then, the motor control device comprises an estimator estimating, based on a motor current to be fed to the motor, an axis error between the d-axis and the γ-axis, and the motor speed,
wherein the control value is the axis error, or a value varying in synchronism with variations in the axis error.

12. A motor control device performing vector control for a motor that drives a load whose load torque varies periodically, the motor control device comprising:
a motor speed deriving portion estimating or detecting a motor speed;
a speed controller producing a specified torque current value such that the motor speed is made to follow a specified motor speed value fed from outside;
a resonance filter producing a corrected torque current value by receiving a control value that varies with variations in the load torque and emphasizing a periodic variation component of the control value;
a torque current corrector producing a specified superimposed torque current value by superimposing the corrected torque current value on the specified torque current value; and
an adjusting portion adjusting a phase of the corrected torque current value by controlling the resonance filter according to mode selection information indicating which control mode of a plurality of control modes is used to control the motor,
wherein the vector control is performed according to the specified superimposed torque current value,
wherein the plurality of control modes include a power consumption priority mode and a vibration suppression priority mode, and
wherein the adjusting portion extracts, from the specified superimposed torque current value, a frequency component of variations in the load torque, and the adjusting portion, when the power consumption priority mode is selected, adjusts the phase of the corrected torque current value such that an amplitude of the frequency component is reduced and, when the vibration suppression priority mode is selected, adjusts the phase of the corrected torque current value such that the amplitude of the frequency component is increased.

13. A motor drive system comprising:
a motor;
an inverter driving the motor; and
the motor control device of claim 9 performing vector control for the motor via the inverter.

14. A compressor using, as a drive source thereof, a torque of the motor provided in the motor drive system of claim 13.

15. A motor drive system comprising:
a motor;
an inverter driving the motor; and
the motor control device of claim 12 performing vector control for the motor via the inverter.

16. A compressor using, as a drive source thereof, a torque of the motor provided in the motor drive system of claim 15.

* * * * *